United States Patent
Leprince et al.

(10) Patent No.: US 8,121,433 B2
(45) Date of Patent: Feb. 21, 2012

(54) ORTHO-RECTIFICATION, COREGISTRATION, AND SUBPIXEL CORRELATION OF OPTICAL SATELLITE AND AERIAL IMAGES

(75) Inventors: Sebastien Leprince, Pasadena, CA (US); Jean-Philippe Avouac, Pasadena, CA (US); Francois Ayoub, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 720 days.

(21) Appl. No.: 12/340,693

(22) Filed: Dec. 20, 2008

(65) Prior Publication Data

US 2010/0232728 A1     Sep. 16, 2010

Related U.S. Application Data

(60) Provisional application No. 61/011,671, filed on Jan. 18, 2008, provisional application No. 61/066,407, filed on Feb. 20, 2008.

(51) Int. Cl.
*G06K 9/32* (2006.01)
(52) U.S. Cl. ............ 382/294; 345/629; 353/5; 342/355; 398/121; 701/13
(58) Field of Classification Search .................. 382/100, 382/103, 106, 181, 190, 191, 195, 276, 278, 382/294, 296; 345/619–689; 353/5; 342/355; 398/121; 701/3–13
See application file for complete search history.

(56) References Cited

U.S. PATENT DOCUMENTS

| | | | | |
|---|---|---|---|---|
| 6,084,989 A * | 7/2000 | Eppler | ......................... | 382/293 |
| 6,373,970 B1 * | 4/2002 | Dong et al. | ................... | 382/128 |
| 7,046,934 B2 * | 5/2006 | Badesha et al. | ............... | 398/121 |
| 7,630,579 B2 * | 12/2009 | Mai et al. | ....................... | 382/284 |
| 7,642,953 B2 * | 1/2010 | Cheng et al. | .................. | 342/179 |
| 7,873,240 B2 * | 1/2011 | Oldroyd | ........................ | 382/294 |

OTHER PUBLICATIONS

A. Almansa, B. Rouge, and S. Jaffard, "Irregular sampling in satellite images and reconstruction algorithms," in *Proc. 35th CANUM*, Jun. 2003. [Online]. Available: http://www.fing.edu.uy/~almansa/HDRI9_Almansa2003-CANUM-psample.pdf.

Z. Altamini, P. Sillard, and C. Boucher, "ITRF 2000: A new release of the international terrestrial reference frame for Earth sciences applications," *J. Geophys. Res.*, vol. 107, No. B10, p. 2214, 2002.

*ASTER User's Guide, Part I*, Earth Remote Sensing Data Analysis Center, Tokyo, Japan, 2001.

*ASTER User's Guide, Part II*, Earth Remote Sensing Data Analysis Center, Tokyo, Japan, 2001.

J. P. Avouac, F. Ayoub, S. Leprince, O. Konca, and D. Helmberger, "The 2005, Mw 7.6 Kashmir earthquake, rupture kinematics from sub-pixel correlation of ASTER images and seismic waveforms analysis," *Earth Planet. Sci. Lett.*, vol. 249, No. 3/4, pp. 514-528, 2006.

(Continued)

*Primary Examiner* — Anand Bhatnagar
(74) *Attorney, Agent, or Firm* — Steinfl & Bruno, LLP

(57) ABSTRACT

Methods for mapping and resampling images such as satellite or aerial images are presented, including methods to measure relative displacements of images, methods to refine look directions of an aircraft or satellite for aerial or satellite imaging and methods to ortho-rectify and co-register raw satellite or aerial images.

29 Claims, 8 Drawing Sheets

OTHER PUBLICATIONS

E. Baltsavias, Z. Li, and H. Eisenbeiss, "DSM generation and interior orientation determination of IKONOS images using a testfield in Switzerland," in *Proc. ISPRS Workshop High-Resolution Earth Imaging Geospatial Inj.*, Hannover, Germany, 2005.

J. Barzilai and I. Borwein, "Two-point step size gradient methods," *IMA J. Numer. Anal.*,vol. 8,No. I,pp. 141-148, 1988.

E. Berthier, H. Vadon, D. Baratoux, Y. Arnaud, C. Vincent, K. Feigl, F. Remy, and B. Legresy, "Surface motion of mountain glaciers derived from satellite optical imagery," *Remote Sens. Environ.*, vol. 95, No. 1, pp. 14-28, 2005.

R. Binet and L. Bollinger, "Horizontal coseismic deformation of the 2003 Bam (Iran) earthquake measured from SPOT-5 THR satellite imagery," *Geophys. Res. Lett.*, vol. 32, No. 2, pp. L02307.1-L02307.4, 2005.

A. Boullon, E. Breton, F. D. Lussy, and R. Gachet, "SPOT5 HRG and HRS first inflight geometry quality results," in *Proc. SPIE-Sensors, Systems, Next-Generation Satellites VI*, 2003, vol. 4881, pp. 212-223.

E. Breton, A. Bouillon, R. Gachet, and F. Delussy, "Pre-flight and in-flight geometric calibration of SPOT5 HRG and HRS images," in *Proc. ISPRS Commission I Symp., Pecora I5/Land Satellite Inj. IV Conj.*, Denver, CO, 2002.

N. Bryant, A. Zobrist, and T. Logan, "Automatic co-registration of spacebased sensors for precision change detection and analysis," in*Proc. IGARSS*, Jul. 2003, vol. 2, pp. 1371-1373.

H. Carfantan and B. Rouge, "Estimation non biaisee de decalages subpixelaire sur les images SPOT," in *Proc. Colloque GRETSI*, Toulouse, France, Sep. 2001.

L. Chen and L. Lee, "Rigorous generation of digital orthophotos from SPOT images," *Photogramm. Eng. Remote Sens.*, vol. 59, No. 5, pp. 655-661, 1993.

R. Crippen and R. 810m, "Measurement of subresolution terrain displacements using SPOT panchromatic imagery," in*Proc. IGARSS*, Jun. 1991, vol. 3, pp. 1667-1670.

Dai and S. Khorram, "Effects of images misregistration on the accuracy of remotely sensed change detection," *IEEE Trans. Geosci. Remote Sens.*, vol. 36, No. 5, pp. 1566-1577, Sep. 1998.

N. Dodgson, "Quadratic interpolation for image resampling," *IEEE Trans. Image Process.*, vol. 6,No. 9,pp. 1322-1326,Sep. 1997.

S. Dominguez, J.-P. Avouac, and R. Michel, "Horizontal coseismic deformation for the 1999 Chi-Chi earthquake measured from SPOT satellite images; implications for the seismic cycle along the western foothills of central Taiwan," *J Geophys. Res.*, vol. 108, No. B2, p. 2083, 2003.

Y. El-Manadili and K. Novak, "Precision rectification of SPOT imagery using the direct linear transformation model," *Photogramm. Eng. Remote Sens.*, vol. 62, No. 1, pp. 67-72, 1996.

Y. Fialko, M. Simons, and D. Agnew, "The complete (3-D) surface displacement field in the epicentral area of the 1999 Mw 7.1 Hector Mine earthquake, California, form space geodetic observations," Geophys. Res. Lett., vol. 28, No. 16, pp. 3063-3066, 2001.

D. Field, "Relations between the statistics of natural images and the response properties of cortical-cells," *J Opt. Soc. Amer. A, Opt. Image Sci.*, vol. 4, No. 12, pp. 2379-2394, 1987.

H. Foroosh, J. Zerubia, and M. Berthod, "Extension of phase correlation to subpixel registration," IEEE Trans. Image Process., vol. 11, No. 3, pp. 188-200, Mar. 2002.

R. Gachet, "SPOTS in-flight commissioning: Inner orientation of HRG and HRS instruments," in Proc. XXth ISPRS Congr., Commission I, Istanbul, Turkey, 2004, vol. 35.

W. Hoge, "A subspace indentification extecsion to the phase correlation method [mri application],"IEEE Trans. Med. Imag., vol. 22, No. 2, pp. 277-280, Feb. 2003.

K. Jacobsen, "Calibration of optical sensors," in Proc. ISPRS Commission I, Int. Calibration Orientation Workshop EuroCOW, Castelldefels, Spain, 2006.

C. Jayles and M. Costes, "Ten centimeters orbits in real-time onboard of a satellite, DORIS/DIODE current status," Acta Astronaut., vol. 54, No. 5, pp. 315-323, 2004.

R. Keys, "Cubic convolution interpolation for digital image processing," IEEE Trans. Acoust., Speech, Signal Process., vol. ASSP-29, No. 6, pp. 1153-1160, Dec. 1981.

Y. Klinger, R. Michel, and R. King, "Evidence for a barrier model from Mw 7.8 kokoxili (Tibet) earthquake slip-distribution," Earth Planet. Sci. Lett., vol. 242, No. 3/4, pp. 354-364, Feb. 2006.

C. Knapp and G.C. Carter, "The generalized correlation method for estimation of time delay," IEEE Trans. Acoust., Speech, Signal Process., vol. ASSP-24, No. 4, pp. 320-327, Aug. 1976.

C. Latry and B. Rouge, "Optimized sampling for CCD instruments: The Supermode scheme," in Proc. IGARSS, Jul. 2000, vol. 5, pp. 2322-2324.

S. Leprince, S. Barbot, F. Ayoub, and J. P. Avouac, "Automatic and precise orthorectification, coregistration and subpixel correlation of satellite images, application to ground deformation measurements," IEEE Trans. Geosci. Remote Sens., vol. 45, No. 6, pp. 1529-1558,Jun. 2007.

S. Leprince, F. Ayoub, Y. Klinger, and J. P. Avouac, "Co-registration of optically sensed images and correlation (COSI-Corr): An operational methodology for ground deformation measurement," in Proc. IGARSS, Barcelona, Spain, Jul. 2007, vol. 6, pp. 1943-1946.

S. Leprince, E. Berthier, F. Ayoub, C. Delacourt, and J. P. Avouac, "Monitoring earth surface dynamics with optical imagery," EOS, Trans. Amer. Geophys. Union, vol. 89, No. I, pp. 1-2, Jan. 2008.

J. Manton, R. Mahony, and Y. Hua, "The geometry of weighted low-rank approximations," IEEE Trans. Signal Process, vol. 51, No. 2, pp. 500-514, Feb. 2003.

D. Massonnet, M. Rossi, C. Carmona, F. Adragna, G. Peltzer, K. Feigl, and T. Rabaute, "The displacement field of the Landers earthquake mapped by radar interferometry," Nature, vol. 364, No. 6433, pp. 138-142, Jul. 1993

R. Michel and J.-P. Avouac, "Deformation due to the Aug. 17, 1999 Izmit, Turkey, earthquake measured from SPOT images," J. Geophys. Res., vol. 107, No. B4, p. 2062, 2002.

R. Michel, J. P. Avouac, and J. Taboury, "Measuring near field coseismic displacements from SAR images: Application to the Landers earthquake," Geophys. Res. Lett., vol. 26, No. 19, pp. 3017-3020, 1999.

G. Peltzer, F. Crampe, and P. Rosen, "The Mw 7.1, Hector Mine, California earthquake: Surface rupture, surface displacement field, and fault slip solution from ERS SAR data," C. R. Acad. Sci. Paris, Earth Planet. Sci., vol. 333, No. 9, pp. 545-555, 2001.

W. Pratt, "Correlation techniques of image registration," IEEE Trans. Aerosp. Electron. Syst., vol. AES-10, No. 3, pp. 353-358, May 1974.

S. Riazanoff, SPOT Satellite Geometry Handbook. Toulouse, France: SPOT Image, Jan. 2002.

C. Schiek, "Terrain change detection using ASTER optical satellite imagery along the Kunlun fault, Tibet," M.S. thesis, Univ. Texas, El Paso, TX, 2004. [Online]. Available:http://www.geo.utep.edu/pub/schiek/Cara_Schiek_Master_Thesis.pdf.

*Shuttle Radar Topography Mission*, 2000, JPL-NASA. [Online]. Available: http://www2.jpl.nasa.gov/srtm/statistics.html.

M. Simons, Y. Fialko, and L. Rivera, "Coseismic deformation from the 1999 Mw 7.1 Hector Mine, California, earthquake as inferred from InSAR and GPS observations," *Bull. Seismol. Soc. Amer.*, vol. 92, No. 4, pp. 1390-1402, 2002.

J. Snyder, *Map Projections—A Working Manual*, ser. U.S. Geological Survey Professional Paper 1395. Washington, DC: Government Printing Office, 1987.

*SPOT User's Handbook*, SPOT Image Corporation, Reston, VA, 1990

H. Stone, M. Orchard, C. Ee-Chien, and S. Martucci, "A fast direct Fourier-based algorithm for subpixel registration of images," *IEEE Trans. Geosci. Remote Sens.*, vol. 39, No. 10, pp. 2235-2243, Oct. 2001.

I. Sutherland and G. Hodgman, "Reentrant polygon clipping," *Commun. ACM*, vol. 17, No. 1, pp. 32-42, Jan. 1974.

M. Sveldow, C. McGillem, and P. Anuta, "Image registration: Similarity measure and preprocessing method comparisons," *IEEE Trans. Aerosp. Electron. Syst.*, vol. AES-14, No. 1, pp. 141-149, Jan. 1978.

M. Taylor, S. Leprince, J. P. Avouac, and K. Sieh, "Detecting coseismic displacements in glaciated regions: An example from the great Nov. 2002 Denali earthquake using SPOT horizontal offsets," *Earth Planet. Sci. Lett.*, 2007. to be published.

Y. Teshima and A. Iwasaki, "Correction of attitude fluctuation of Terra spacecraft using ASTERISWIR imagery with parallax observation," *IEEE Trans. Geosci. Remote Sens.*, vol. 46, No. 1, pp. 222-227, Jan. 2008.

D. Tolhurst, Y. Tadmor, and T. Chao, "Amplitude spectra of natural images," *Ophthalmic Physiol. Opt.*, vol. 12, No. 2, pp. 229-232, 1992.

J. Townshend, C. Justice, C. Gurney, and J. McManus, "The impact of misregistration on change detection," *IEEE Trans. Geosci. Remote Sens.*, vol. 30, No. 5, pp. 1054-1060, Sep. 1992.

J. A. Treiman, K. J. Kendrick, W. A. Bryant, T. K. Rockwell, and S. F. McGill, "Primary surface rupture associated with the Mw 7.1 Oct. 16, 1999 Hector Mine earthquake, San Bernardino County, California," *Bull. Seismol. Soc. Amer.*, vol. 92, No. 4, pp. 1171-1191, 2002.

H. Vadon and D. Massonnet, "Earthquake displacement fields mapped by very precise correlation. Complementarity with radar interferometry," in *Proc. IGARSS*, Honolulu, HI, Jul. 2000, vol. 6, pp. 2700-2702.

A. van der Schaaf and J. van Hateren, "Hodeling the power spectra of natural images: Statistics and information," *Vis. Res.*, vol. 36, No. 17, pp. 2759-2770, 1996.

N. Van Puymbroeck, R. Michel, R. Binet, J.-P. Avouac, and J. Taboury, "Measuring earthquakes from optical satellite images," *Appl. Opt.*, vol. 39, No. 20, pp. 3486-3494, Jul. 2000.

T. Westin, "Interior orientation of SPOT imagery," in *Proc. 27th ISPRS Congr., Commission I*, Washington, DC, 1992, vol. 29, pp. 193-198.1558 IEEE Transactions on Geoscience and Remote Sensing, vol. 45, No. 6, Jun. 2007.

T. Westin, "Precision rectification of SPOT imagery," *Photogramm. Eng. Remote Sens.*, vol. 56, No. 2, pp. 247-253, 1990.

T. Westin, "Inflight calibration of SPOT CCD detector geometry," *Photogramm. Eng. Remote Sens.*, vol. 58, No. 9, pp. 1313-1319, Sep. 1992.

X. Li and H. Gotze, "Tutorial: Ellipsoid, geoid, gravity, geodesy, and geophysics," *Geophysics*, vol. 66, No. 6, pp. 1660-1668, 2001.

B. Zitova and J. Flusser, "Image registration methods: A survery," *Image Vis. Comput.*, vol. 21, No. II, pp. 977-1000, 2003

Barisin, I., et al., Deformation measurements for the Sep. 2005 AFAR rifting event from sub-pixel correlation of SPOT images.

Berthier, E., et al., Recent rapid thinning of the "Mer de Glace" glacier derived from satellite optical images, Geophysical Research Letters 2004, 31: L17401-1-L17401-4.

CalTech Online Catalog, [Online], available: www.data.scec.org/catalog_search/date_mag_loc.php, retrieved on Mar. 18, 2011.

Delacourt, C., et al., Velocity field of the "La Clapiere" landslide measured by the correlation of aerial and QuickBird satellite images, Geophysical Research Letters 2004, 31: L15619-1-L15619-5.

Du, W., et al., Triggered aseismic fault slip from nearby earthquakes, static or dynamic effect?, Journal of Geophysical Research 2003, 108: 24-1-24-21.

Feigl, K., et al., Estimating slip distribution for the Izmit mainshock from coseismic GPS, ERS-1, RADARSAT, and SPOT measurements, Bulletin of the Seismological Society of America 2002, 92: 138-160.

Klinger, Y., et al., High-resolution satellite imagery mapping of the surface rupture and slip distribution of the M-W similar to 7.8, Nov. 14, 2001 Kokoxili earthquake, Kunlun Falut, northern Tibet, China, Bulletin of the Seismological Society of America 2005, 95: 1970-1987.

Leprince, S., Automatic and precise orthorectification, coregistration, and subpixel correlation of satellite images, application to ground deformation measurements, IEEE Trans. On Geosci. And Remote Sensing 2007, 45: 1529-1558.

Michel, R., et al., Coseismic surface deformation from air photo: The Kickapoo step over in the Landers rupture, Journal of Geophysical Research 2006, 111: B03408 1-13.

National Aerial Photography Program (NAPP), US Geological Survey. [Online]. Available: http://eros.usgs.gov/, retrieved on Mar. 18, 2011.

National Elevation Dataset, US Geological Survey. [Online]. Available: http://ned.usgs.gov/, retrieved on Mar. 18, 2011.

Schwarz, K.P., et al., An integrated INS/GPS approach to the georeferencing of remotely sensed data, Photogrammetric Engineering & Remote Sensing 1993, 59: 1667-1674.

Sieh, K., et al., Near-field investigations of the Landers earthquake sequence, Apr. to Jul. 1992, Science 1993, 260: 171-176.

Westin, T., Inflight Calibration of SPOT CCD Detector Geometry, Photogrammetric Engineering & Remote Sensing Sep. 1992, vol. 58, No. 9, pp. 1313-1319.

\* cited by examiner

ORTHO-RECTIFICATION, COREGISTRATION, AND SUBPIXEL CORRELATION OF OPTICAL SATELLITE AND AERIAL IMAGES

CROSS REFERENCE TO RELATED APPLICATIONS

The present application claims priority to U.S. Provisional Application No. 61/011,671 for "Automatic and Precise Ortho-Rectification, Coregistration, and Subpixel Correlation of Optical Satellite and Aerial Images" filed on Jan. 18, 2008, and to U.S. Provisional Application No. 61/066,407 for "In-flight CCD Distortion Calibration for Orbiting Optical Sensors Based on Subpixel Correlation" filed on Feb. 20, 2008, both of which are incorporated herein by reference in their entirety. The present application is also related to U.S. patent application Ser. No. 12/340,696 filed on even date herewith, for "Distortion Calibration For Optical Sensors." Also this application is incorporated herein by reference in its entirety.

FEDERAL SUPPORT STATEMENT

The U.S. Government has certain rights in this invention pursuant to Grant No. EAR0409652 and EAR0636097 awarded by the National Science Foundation.

FIELD

The present disclosure relates to image analysis and image processing. More particularly, it relates to methods for mapping and resampling images such as satellite or aerial images. It also relates to methods to measure relative displacements of images and methods to refine look directions of an aircraft or satellite for aerial or satellite imaging. It further relates to methods to ortho-rectify and co-register raw satellite or aerial images.

BACKGROUND

Earth surface changes can be determined by comparing pairs of optical satellite images acquired on different dates. Precise images co-registration is a prerequisite in such applications, and this critical step is often a major source of limitation [1], [2]. For instance, a registration accuracy of less than 1/5 of a pixel is required to achieve a change detection error of less than 10% in Landsat Thematic Mapper images [3].

As to the measurement of ground surface displacements, most applications require a measurement accuracy of less than 1 m. This implies that the images co-registration accuracy should be even less, i.e., significantly smaller than the pixel size of most currently available optical satellite images. Examples of such applications include the measurement of coseismic ground deformations [4]-[7], ice flow [8], and sand dune migrations [9]. Difficulties in accurately co-registering satellite images arise from the non-ideal characteristics of the optical systems, the changing attitude of the spacecraft during the scanning operation of the images, digital elevation model (DEM) errors, and inaccurate resampling. The accuracy of the measurements of ground displacements, in addition, depends on the performance of the correlation technique. Despite these difficulties, encouraging results were obtained in a number of studies. It should be noted, however, that they were all carried on using data from only one imaging system and under restrictive conditions such as similar viewing angles and satellite tracks [4], [10], [11] or using external information from global positioning system (GPS) measurements [6]. Precise co-registration of images with viewing angle differing by more than 3° also seems out of reach [4], [11]. The operational use of such a technique, in particular to monitor coseismic deformations, would benefit from a more generic approach, allowing to cross-correlate images from different imaging systems with different viewing angles, and without the need for information other than what is extracted from the satellite ancillary data and the topography.

Known orthorectification and phase correlation models will be now briefly discussed.

A) Direct Orthorectification Model

The direct orthorectification model computes the geographic location on the ground where each pixel in the raw image, i.e., the focal plane of the instrument, has to be projected. Notations are derived from the SPOT satellite geometry handbook [15].

A1) Navigation Reference Coordinate System and Look Directions

The navigation reference coordinate system $(O_1, X_1, Y_1, Z_1)$ is the spacecraft body fixed reference system.

Pushbroom satellite sensors consist of a CCD line array responsible for the image scanning operation. Expressed in the navigation reference coordinate system, the look directions are modeling the equivalent pointing direction of each CCD element. By being constant during the image acquisition, they provide the internal camera model accounting for the mirror rotation, optical distortions, and calibration parameters resulting from on-ground post-processing. The look directions are provided in ancillary data in the form of a two angle rotation $(\Psi_x, \Psi_y)$ around the satellite body fixed system axes. See FIG. 1. For all columns c and for all rows r in the raw image, the look directions $\vec{u}_1$ are given by $$\vec{u}_1(c, r) = \frac{\vec{u}'_1(c, r)}{\|\vec{u}'_1(c, r)\|_2}, \text{ for all } c, r = 1, \ldots, N$$

with $$\vec{u}'_1(c, r) = \begin{pmatrix} -\tan\Psi_y(c) \\ \tan\Psi_x(c) \\ -1 \end{pmatrix}, \text{ for all } r,$$

where N is the number of CCD elements in the line array.

A2) Orbital Coordinate System and Attitude Variations

The orbital coordinate system $(O_2, X_2, Y_2, Z_2)$ is centered on the satellite $(O_2 = O_1)$, and its orientation is based on the spacecraft position in space. See FIG. 2. Roll, pitch, and yaw variations are given as rotation angles around the $Y_2$, $X_2$, and $Z_2$ axes defined by $$\begin{cases} \vec{Z}_2(t) = \dfrac{\vec{P}(t)}{\|\vec{P}(t)\|_2} \\ \vec{X}_2(t) = \dfrac{\vec{V}(t) \wedge \vec{Z}_2(t)}{\|\vec{V}(t) \wedge \vec{Z}_2(t)\|_2} \\ \vec{Y}_2(t) = \vec{Z}_2(t) \wedge \vec{X}_2(t), \end{cases}$$

where $\vec{P}(t)$ and $\vec{V}(t)$ are the instantaneous position and velocity of the satellite, respectively, as shown in FIG. 2. The satellite look directions $\vec{u}_2(c,r)$ in the orbital coordinate system for all CCD elements are given, for all c, r=1, ..., N, by $\vec{u}_2(c,r) = R_r(r) \cdot R_p(r) \cdot R_y(r) \cdot \vec{u}_1(c)$, where $R_r(r)$, $R_p(r)$, and $R_y(r)$ are the roll, pitch, and yaw rotation matrices at the time of acquisition of image row r.

A3) Look Directions in Terrestrial Coordinate System

For each pixel in the raw image, the corresponding look direction $\vec{u}_3$ expressed within the terrestrial coordinate system is given by $$\vec{u}_3(c, r) = \begin{bmatrix} X_{2_x}(r) & Y_{2_x}(r) & Z_{2_x}(r) \\ X_{2_y}(r) & Y_{2_y}(r) & Z_{2_y}(r) \\ X_{2_z}(r) & Y_{2_z}(r) & Z_{2_z}(r) \end{bmatrix} \cdot \vec{u}_2(c, r).$$

A4) Location on Earth Model

The corresponding ground location M of the raw image pixel (c,r) is determined by calculating the intersection between $\vec{u}_3(c,r)$ and the Earth ellipsoid model. For any of such pixel, the point $M(x_M, y_M, z_M)$ has to be found that verifies $$\overrightarrow{O_3M}(c, r) = \overrightarrow{O_3P}(r) + \mu \cdot \vec{u}_3(c, r), \text{ for } \mu > 0$$

$$\text{and } \frac{x^2+y^2}{A^2} + \frac{z^2}{B^2} = 1, \text{ with } \begin{cases} A = a+h \\ B = b+h, \end{cases}$$

where $O_3$ is the Earth Cartesian center and a and b are, respectively, the semimajor and semiminor axis of the ellipsoid. h is the approximated elevation above the ellipsoid at the ground location M.

Using a DEM, the intersection with the topographic surface is computed by locally and successively approximating the topography with a wider ellipsoid.

B) Phase Correlation Methods

Phase correlation methods have already shown good results for the measurement of ground deformation [4], [6], [7], [10]. All phase correlation methods rely on the Fourier shift theorem [23]: : The relative displacement between a pair of similar images is retrieved from the phase difference of their Fourier transform. Let $i_1$ and $i_2$ be two images that differ only by a displacement $(\Delta_x, \Delta_y)$ such that $i_2(x,y) = i_1(x-\Delta_x, y-\Delta_y)$.

By denoting by $I_1$ and $I_2$ their Fourier transform, from the Fourier shift theorem, we have the relation $$I_2(\omega_x,\omega_y) = I_1(\omega_x,\omega_y)e^{-j(\omega_x\Delta_x + \omega_y\Delta_y)},$$

where $\omega_x$ and $\omega_y$ are the frequency variables in column and row. The normalized cross-spectrum of the images i1 and i2 is then $$C_{i_1 i_2}(\omega_x, \omega_y) = \frac{I_1(\omega_x, \omega_y)I_2^*(\omega_x, \omega_y)}{|I_1(\omega_x, \omega_y)I_2^*(\omega_x, \omega_y)|} = e^{j(\omega_x\Delta_x + \omega_y\Delta_y)},$$

where * denotes the complex conjugate. The images' relative displacement can thus be estimated from the 2-D slope of the cross-spectrum's phase. By applying the inverse Fourier transform, we have the correlation function $$F^{-1}\{e^{j(\omega_x\Delta_x + \omega_y\Delta_y)}\} = \delta(x+\Delta_x, y+\Delta_y).$$

The images' relative displacement can then alternatively be estimated from the coordinates of the correlation peak. In case of subpixel displacements, this peak is not a Dirac delta function anymore, but a down-sampled version of a Dirichlet kernel [26]. Further processing is then required to recover the image shift. These approaches show that phase correlation methods fall into two categories. In the first category, the relative images' shift is recovered by explicitly estimating the linear phase of the images' cross-spectrum [4], [27], [28].

In the second category, the relative displacement is calculated by determining the exact location of the correlation peak [26]. This is generally not the case when images have been resampled for orthorectification. Also, to avoid correlation bias, frequency masking should be applied to only select parts of the cross-spectrum where the phase information is valid (images may be corrupted by aliasing or optical aberrations). For these reasons, a correlation algorithm whose main scheme belongs to the first category will be described, adaptive masking being applied on the cross-spectrum.

In [27], a robust approach has been proposed to evaluate the images phase difference. The normalized cross-spectrum matrix $C(\omega_x,\omega_y)$ is, theoretically, a rank one matrix since C is separable. The idea of the study in [27] is to determine the best rank one approximation to the normalized cross-spectrum matrix. The displacement vector is recovered by calculating the slope of the unwrapped phase of the first singular vector, in each dimension. This method has proven a strong robustness against noise. However, there are two main drawbacks remaining. First, it is also subjected to phase wrapping. Even though this approach involves only 1-D unwrapping, it still remains a sensitive step. The second drawback, which is the main concern, is that the whole normalized cross-spectrum matrix (or a rectangular subset of it) has to be used to compute the best rank one approximation. This computation is potentially biased with corrupted phase values. A solution would be to use a weighted SVD, but most of these algorithms require the weight matrix to be positive definite symmetric [34]. Frequency weights with no a priori constraint on the spectrum orientation or separability should be applied.

In [4], another approach is proposed based on the Hermitian inner product of two functions. Define the theoretical normalized cross-spectrum of the images by $C(\omega_x,\omega_y) = e^{j(\omega_x\Delta_x + \omega_y\Delta_y)}$ and the one actually computed by $Q(\omega_x,\omega_y)$. The projection of Q onto the continuous space defined by the theoretical cross-spectrums is defined as $$P_{Q,C}(\Delta_x, \Delta_y) = \sum_{\omega_x}\sum_{\omega_y} Q(\omega_x\omega_y)C^*(\omega_x, \omega_y)$$

$$= \sum_{\omega_x}\sum_{\omega_y} Q(\omega_x\omega_y)e^{-j(\omega_x\Delta_x + \omega_y\Delta_y)}.$$

The values of $\Delta_x$ and $\Delta_y$ that maximize the norm of this projection are the ones that are the most likely to solve the registration problem. It is then proposed to find $(\Delta_x,\Delta_y)$ that maximizes the modulus $|MP_{Q,C}(\Delta_x,\Delta_y)|$, where $$MP_{Q,C}(\Delta_x, \Delta_y) = \sum_{\omega_x}\sum_{\omega_y} M(\omega_x, \omega_y)Q(\omega_x, \omega_y)e^{-j(\omega_x\Delta_x + \omega_y\Delta_y)},$$

and $M(\omega_x,\omega_y)$ is a binary mask to filter out some frequencies. This technique is effective and insensitive to phase wrapping. It is suitable for both large and small displacement measurements; however, the resolution method proposed, based on a dichotomy, is computationally inefficient. Also, the frequency masking is not properly set.

SUMMARY

According to a first aspect, a method to ortho-rectify and co-register a set of raw satellite or raw aerial images of a surface is provided, the method comprising: selecting a first raw satellite or raw aerial image; generating a first set of ground control points for the first raw image, with respect to a given ortho-rectified reference image; based on the first set of generated ground control points, mapping the first raw image onto ground; resampling the first mapped image to produce a first ortho-rectified image; selecting a second raw satellite or raw aerial image, the second image being selected from the set of satellite or aerial images; generating a second set of ground control points for the second raw image, with respect to the first ortho-rectified image, by way of frequency correlation on the first image; based on the second set of generated ground control points, mapping the second raw image onto ground; and resampling the second mapped image, to produce a second ortho-rectified image, whereby the first ortho-rectified image and the second ortho-rectified image are co-registered images.

According to a second aspect, a method for mapping an aerial or satellite image from an aerial or satellite image plane onto a ground reference system is disclosed, the method comprising: i) determining an image footprint of the aerial or satellite image; ii) defining the ground reference system; and iii) for each point on the ground pertaining to the ground reference system, finding coordinates in the aerial or satellite image that are associated with said point on the ground by: a) defining a projection plane by way of ground coordinates of said point on the ground; b) defining a projection for all points in the aerial or satellite plane onto the projection plane to obtain projected image points; c) defining distances between said point on the ground and the projected image points; and d) choosing, as image coordinates of said point on the ground, the image coordinates of the projected image point having minimum distance from the point on the ground.

According to a third aspect, a method for irregularly resampling uniformly spaced data of a sampled signal representing an aerial or satellite image is provided, comprising i) defining an image reconstruction filter of the form $$h_{r_{d_x,d_y}}(x, y) = \begin{cases} \dfrac{\sin\left(\frac{\pi x}{d_x}\right)}{\frac{\pi x}{d_x}} \cdot \dfrac{\sin\left(\frac{\pi y}{d_y}\right)}{\frac{\pi y}{d_y}}, & \text{for } x, y \neq 0, \\ 1, & \text{for } x, y = 0, \end{cases}$$

wherein $h_r$ is the image reconstruction filter, $x$ and $y$ are directions of the aerial or satellite image, and $d_x$ and $d_y$ are resampling distances representing maximum distance between adjacent samples in the $x$ and $y$ directions, and ii) reconstructing the resampled image signal according to the image reconstruction filter.

According to a fourth aspect, a method to measure relative displacement between two images of the same resolution, one being a shifted version of the other, is disclosed, the method comprising: determining a position of best registration between the two images; and determining relative displacement between the two images based on the position of best registration by calculating when cross correlation between the two images attains a maximum, the cross correlation being evaluated through a phase correlation method where relative displacement between the two images is recovered from a phase difference of a Fourier transform of the two images, wherein the phase difference of the Fourier transform of the two images is calculated through minimization of a weighted residual matrix between a computed normalized cross spectrum of the two images and a theoretical normalized cross spectrum of the two images.

According to a fifth aspect, a method to refine look directions of an aircraft or satellite for aerial or satellite imaging is provided, comprising: providing a raw image; providing aircraft or satellite ancillary data and a potential initial set of ground control points; selecting image patches in the raw image; and determining ground control points of the raw image by measuring misregistration between the selected image patches and a ground reference image.

Further aspects of the present disclosure are shown in the specification, figures and claims of the present application.

DETAILED DESCRIPTION

Throughout the present application reference will be made, in some examples, to ground displacements. However, the person skilled in the art will understand that any kind of surface displacement can be dealt with by way of the embodiments of the present disclosure, such as static displacements, flow displacements and so on.

A) Inverse Orthorectification

According to an embodiment of the present disclosure, a method for mapping an aerial or satellite image from an aerial or satellite image plane onto a ground reference system is shown.

Figure 1:
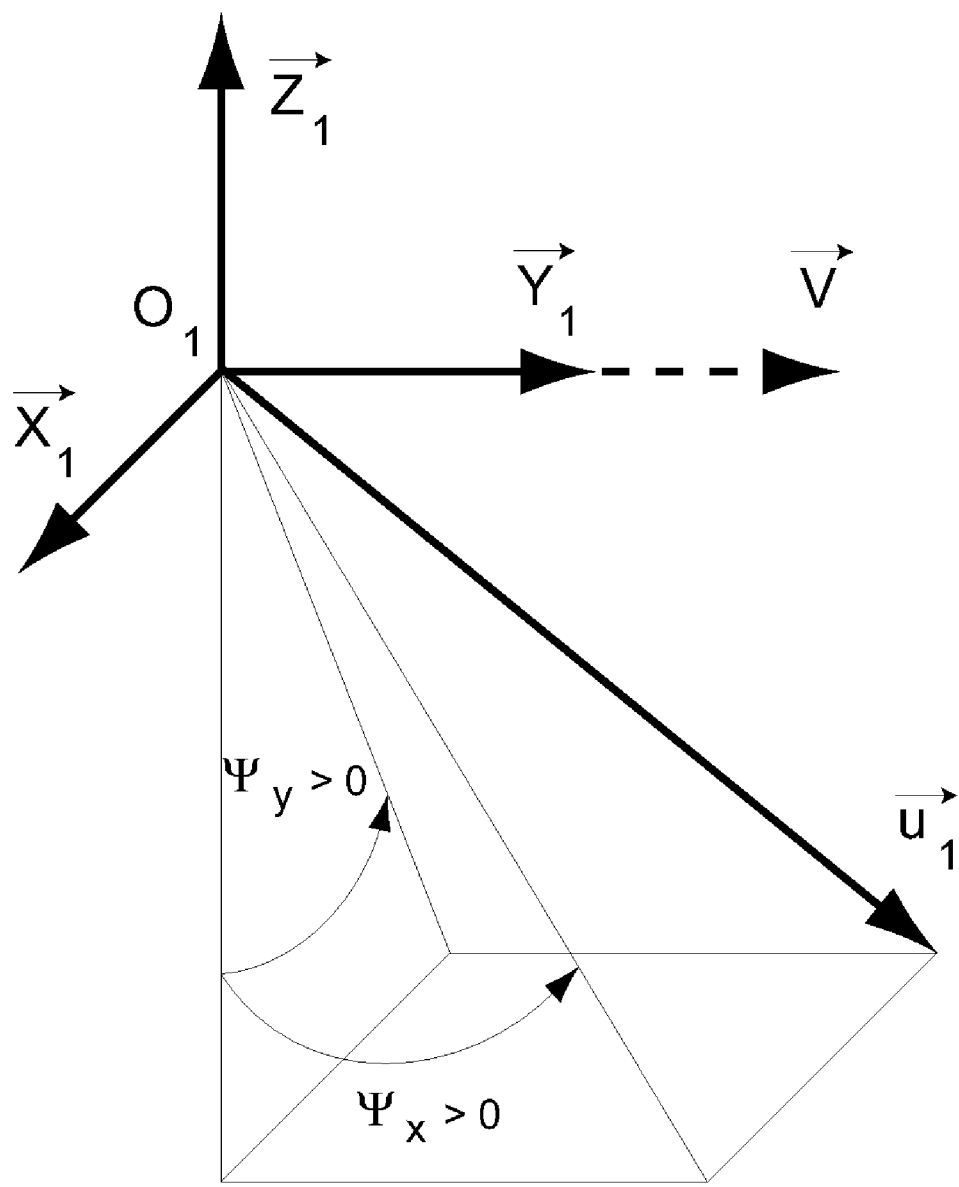
FIG. 1 shows the definition of a look direction from look angles in the navigation reference coordinate system.
Figure 2:
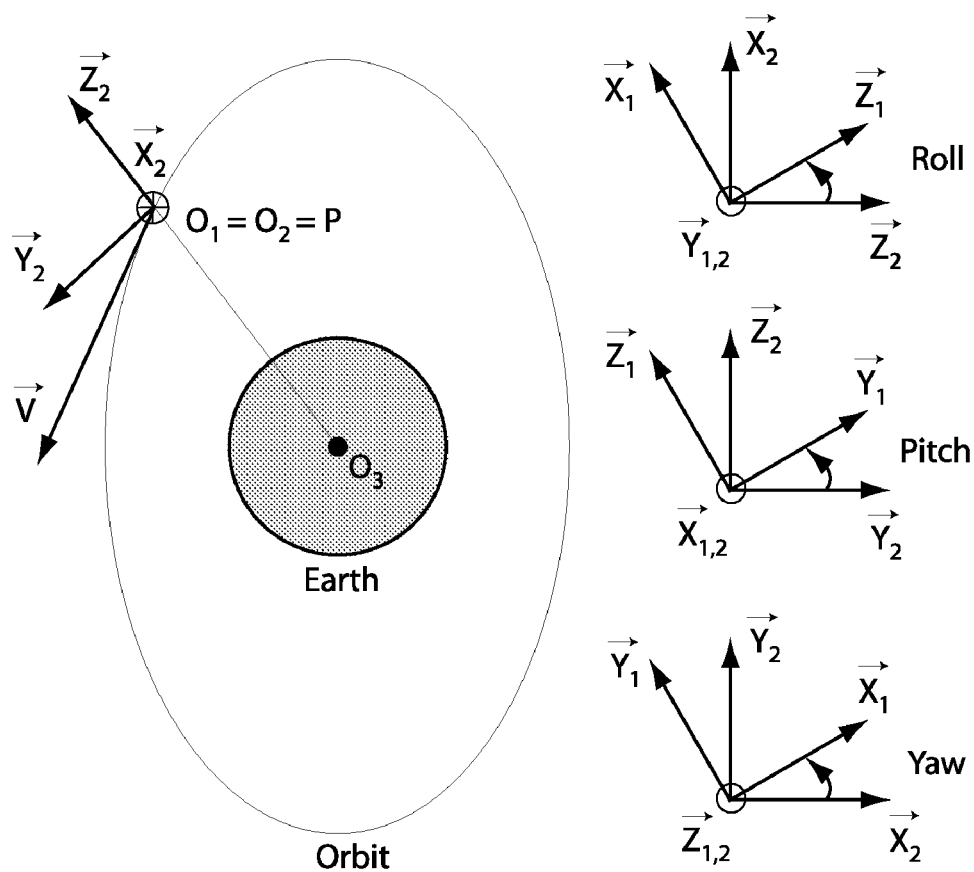
FIG. 2 shows the orbital coordinate system and attitude variations.
Figure 3:
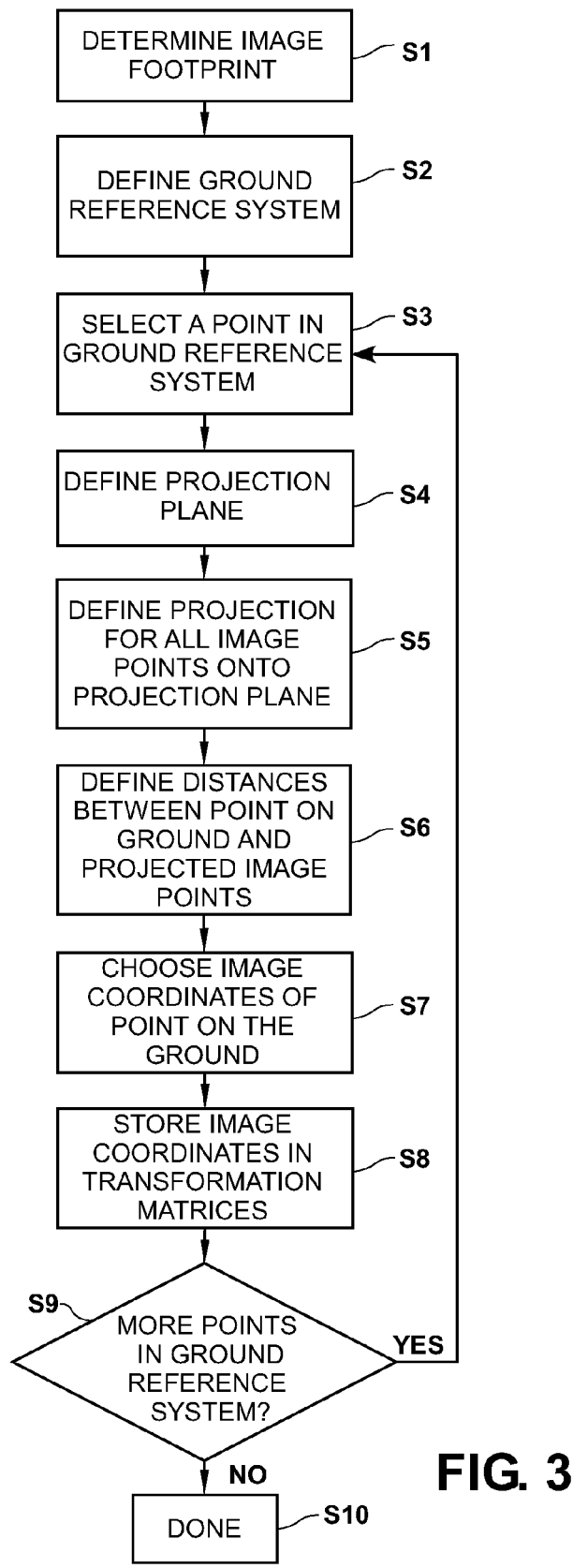
FIG. 3 shows a flowchart with reference to a method for mapping an aerial or satellite image from an aerial or satellite image plane onto a ground reference system in accordance with an embodiment of the present disclosure.

As generally discussed with reference to FIG. 3, in a first step (S1) an image footprint of the aerial or satellite image is determined. A ground reference system is defined (S2) and, for each point on the ground pertaining to the ground reference system, the coordinates in the aerial or satellite image that are associated with the point on the ground are found. In particular, a point in the ground reference system is chosen (S3), and a projection plane (S4) is defined by way of ground coordinates of the point on the ground. A projection (S5) is further defined for all points in the aerial or satellite plane onto the projection plane, to obtain projected image points. Distances (S6) between the point on the ground and the projected image points are defined, and the image coordinates of the projected image point having minimum distance from the point on the ground are chosen as image coordinates of the point on the ground (S7). The chosen image coordinates can be stored (S8) in transformation matrices. In case more points in the ground reference system are desired to be chosen (S9), the flow returns to step (S3). Otherwise, the process ends (S10).

The above embodiment will be now explained in detail, with reference to an example thereof. According to such example, the outputs of the minimization can be stored into matrices with dimensions determined by sampling of the ground reference system. Further, the starting coordinates of the ground reference system can be a multiple of a desired resolution of the aerial or satellite ortho-rectified image. Minimization can be performed with a gradient algorithm, for example a two-point step size gradient algorithm. The ground reference system can be defined as the smallest rectangular grid that includes the image footprint.

In particular, to allow for the rigorous resampling of the images to orthorectify, applicants determine the non-integer pixel coordinates in the raw image of a predefined regular grid on the ground. This operation, called the inverse orthorectification model, has been investigated in several studies [18]-[20]. However, they are all based on the collinearity equations stating that a point in the focal plane, the optical center, and the imaged point on the ground are all aligned. This assumption is no longer valid in the presence of aberrations or distortions from the imaging system. Modern satellites, such as SPOT satellites, provide look directions as a complete physical model of the imaging system [15]. Applicants therefore propose a new inverse orthorectification scheme, which fully exploits the information from the ancillary data, by inverting the direct orthorectification model. Applicants' scheme assumes that any given point on the ground lying inside or in the close vicinity of the imaged area has one and only one corresponding point in the image plane or in its close vicinity. Applicants extend the assumption to the close vicinity of the image because applicants extrapolate attitude and sensor values outside the image plane. In practice, this assumption is satisfied when dealing with a stable imaging system and can be verified a posteriori.

A1) Orthorectification Grid

To compare a set of co-registered images, all images have to be rectified onto a common grid. Applicants define, in the present example, the orthorectification grid as the smallest rectangular grid that includes the image footprint and whose starting coordinates (typically expressed within the Universal Transverse Mercator—UTM-coordinate system) are multiple of the desired image resolution. Comparable images (ortho-rectified at the same resolution) will then not suffer from grid misalignment. The image footprint is determined by application of the direct orthorectification model to the four corners of the raw image.

A2) Inverse Orthorectification Principle

Figure 4:
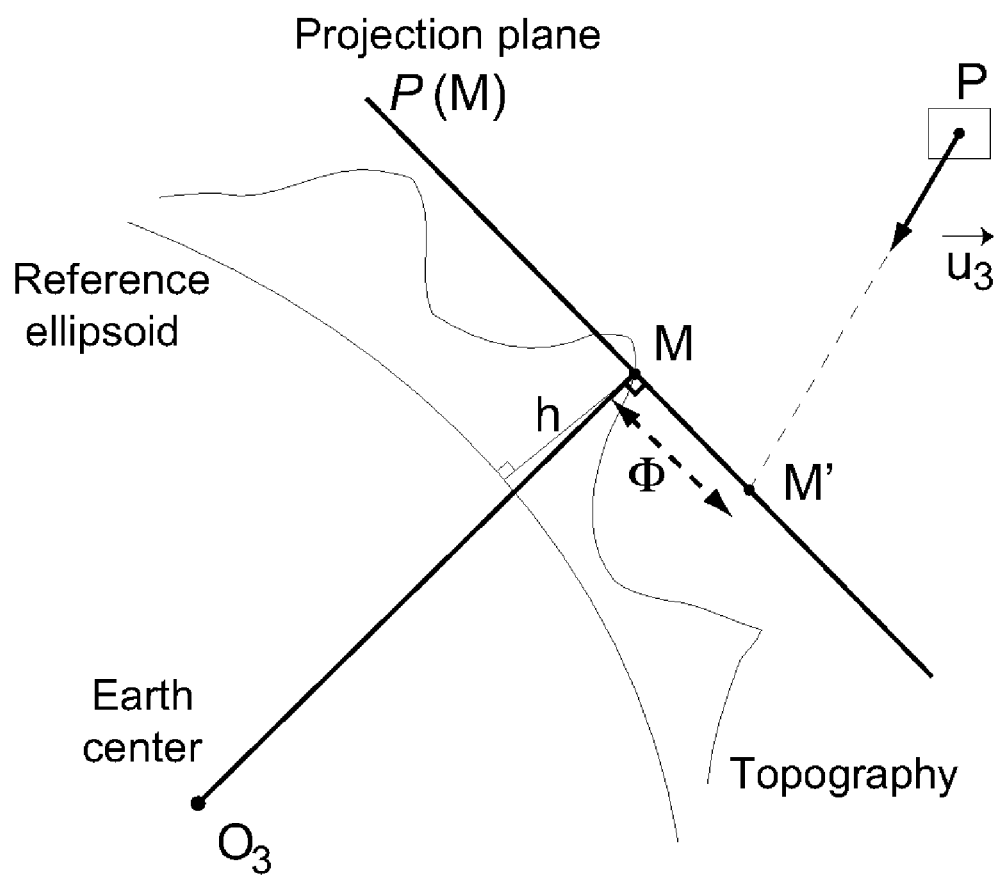
FIG. 4 shows an inverse orthorectification model principle in accordance with the embodiment of FIG. 3.

Given a point M on the ground (on the orthorectification grid), its elevation is determined from bicubic interpolation of the DEM, and its coordinates converted into the Earth centered Cartesian WGS 84 system [17]. The look directions $\vec{u}_3(c,r)$ are given for all c, r=1, . . . , N. Now, applicants consider a continuous version of the look directions with the notation $(x,y) \in R^2$. Finding the pixel coordinates (x,y) in the raw image that are associated with a given point $M(x_M, y_M, z_M)$ on the ground is equivalent to finding $(x,y) \in R^2$ that minimize the function $$\Phi(x,y) = \|\overrightarrow{O_3M} - \overrightarrow{O_3M'}(x,y)\|_2^2,$$

where M'(x,y) should be the point on the ground seen from the look direction $\vec{u}_3(c,r)$. Let $\overrightarrow{O_3P} = (P_x, P_y, P_z)$ be the satellite position for the look angle $\vec{u}_3$. Assuming a rectilinear propagation of light through the atmosphere, the line of sight implied by $\vec{u}_3 = (u_{3_x}, u_{3_y}, u_{3_z})$ is $\vec{s} = \overrightarrow{O_3P} + t \cdot \vec{u}_3$, for some t>0. If M' lies at the intersection between $\vec{s}$ and the topography, determining its coordinates is extremely tedious, and the non-linearities of the topography may cause the minimization of $\Phi$ to fail. For both simplicity and efficiency, applicants construct a projection plane for each point M on the orthorectification grid, on which M' actually lies. The projection plane P(M) is the plane passing through M and perpendicular to $\overrightarrow{O_3M}$, as shown in FIG. 4.

Since M∈P(M), the solution of the minimization of $\Phi$ is unchanged, but the straightforward computation of M' and the near-quadratic regularity of $\Phi$ are now ensured. All points M'(α,β,γ) in P(M) must satisfy $\overrightarrow{O_3M} \cdot \overrightarrow{MM'} = 0$. Hence, the projection plane is explicitly defined by $$x_M \alpha + y_M \beta + z_M \gamma - (x_M^2 + y_M^2 + z_M^2) = 0.$$

$\vec{s}$ then intersects P(M) for $$t = t^* = \frac{d - x_M P_x - y_M P_y - z_M P_z}{x_M u_{3_x} + y_M u_{3_y} + z_M u_{3_z}},$$

with $d = x_M^2 + y_M^2 + z_M^2$.

The solution of the inverse orthorectification problem (x*, y*) is therefore obtained by minimizing the function $$\Phi(x,y) = \|\overrightarrow{O_3M} - \overrightarrow{O_3M'}(x,y)\|_2^2, \text{ with}$$

$$\overrightarrow{O_3M'}(x,y) = \overrightarrow{O_3P}(y) + t^* \cdot \vec{u}_3(x,y),$$

for all points M in the orthorectification grid.

A3) Minimizing $\Phi$

By projecting M' onto the plane surface P(M), the nonlinearities of $\Phi$ are now only due to the satellite optical distortions and changing attitudes, which are smoothly varying in the vicinity of the solution. The problem of minimizing $\Phi$ is then quasi-linear, and the near-quadratic regularity of $\Phi$ makes an unconstrained gradient minimization approach appropriate. The algorithm requires that $\Phi$ be a continuous function for all x,y∈R, while it is only given at integer pixel locations. Satellite velocities, positions, attitudes, and sensor orientations are then linearly interpolated between pixels and linearly extrapolated beyond the image limits (to satisfy the unconstrained minimization process). The linear extrapolation should preserve the continuity of the values as well as the global motion of the satellite. Applicants have chosen extrapolated points to lie on the line joining the values at the image limits in both x and y directions. Several classical gradient minimization procedures were tested, namely the quasi-Newton, the steepest descent, or the conjugate gradients algorithms, but applicants occasionally experienced convergence problems when the initialization guess was not accurate. The two-point step size (TPSS) gradient algorithm [21] proved to be more robust and efficient.

A4) Inverse Model Transformation Matrices

Outputs of the minimization are stored into two matrices with dimensions determined by the orthorectification grid. x* values are stored in the X matrix, y* values in the Y matrix. If the ground coordinates of the upper-left-corner grid element are $(E_0,N_0)$ and the grid resolution is r, then at the ground location $(E_0+i\cdot r,N_0-j\cdot r)$ the pixel of coordinates $(X(i,j),Y(i,j))$ in the raw image has to be projected. This inverse orthorectification model is used next to resample raw images and to produce precise orthorectified images.

B) Resampling Irregularly Spaced Data

According to a further embodiment of the present disclosure, a method for irregularly resampling uniformly spaced data of a sampled signal representing an aerial or satellite image is shown.

Figure 5:
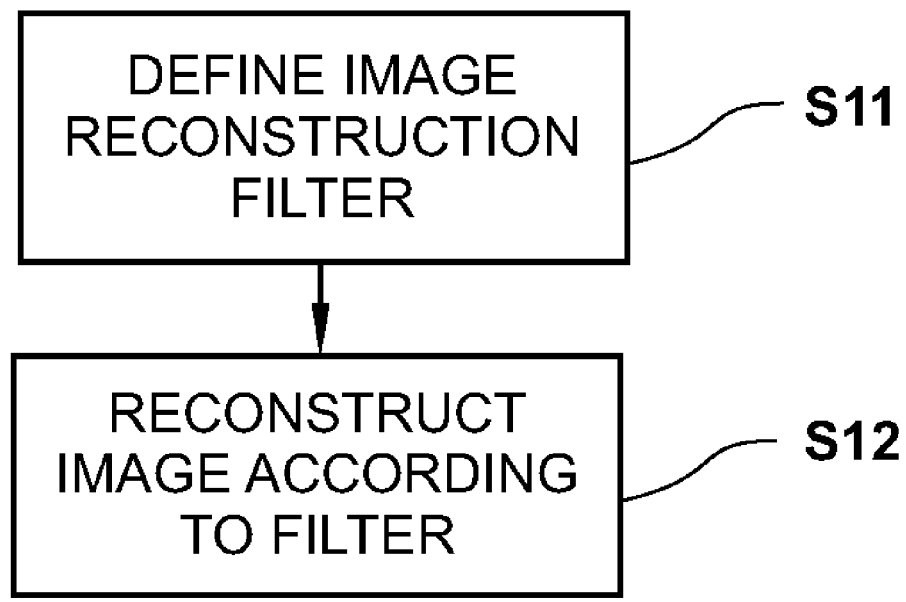
FIG. 5 shows a flowchart with reference to a method for irregularly resampling uniformly spaced data of a sampled signal representing an aerial or satellite image in accordance with an embodiment of the present disclosure.

As generally discussed with reference to FIG. 5, an image reconstruction filter is defined (S11) and the image is reconstructed (S12) according to such filter. The reconstruction filter is based on resampling distances $d_x$ and $d_y$ representing maximum distance between adjacent samples in the x and y directions.

Such embodiment will now be explained in detail, with reference to an example thereof. In such example, the resampling distances $d_x$ and $d_y$ can be obtained from maximum absolute differences between adjacent entries in inverse transformation matrices.

An aliasing-free resampling scheme for irregularly spaced data is presented, meaning that either the original sampled signal is irregularly sampled and has to be regularly resampled or the original signal is regularly sampled and has to be irregularly resampled, or any combination of both situations. For simplification, applicants assume that sampling irregularities account for a small fraction of the mean sampling period. Denote by $\{T0\}$ the set of sampling periods of the signal to be resampled and by $\{T1\}$ the set of sampling periods of the resampled signal. It is supposed that $\mu(\{T_1\}) \gg \sigma(\{T_1\})$, for i=0, 1. Here, $\mu(\cdot)$ represents the mean operator and $\sigma(\cdot)$ the standard deviation operator. $\mu(\{Ti\})=Ti$ and $\sigma(\{Ti\})=0$ for regularly sampled signals.

B1) 2D Resampling Kernel

For simplicity and computational efficiency, applicants concentrate on separable resampling kernels. The reconstruction filter is an ideal low-pass filter of the form $$h_{r_{d_x,d_y}}(x, y) = \begin{cases} \dfrac{\sin\left(\frac{\pi x}{d_x}\right)}{\frac{\pi x}{d_x}} \cdot \dfrac{\sin\left(\frac{\pi y}{d_y}\right)}{\frac{\pi y}{d_y}}, & \text{for } x, y \neq 0, \\ 1, & \text{for } x, y = 0, \end{cases}$$

where dx and dy are called the "resampling distances." They represent the maximum distance between adjacent samples in the x and y directions.

The parameter d of a general reconstruction filter for irregularly spaced data is such that $d=\max(\{T0\},\{T1\})$. This ensures that the resampled signal is aliasing free. However, it is locally subjected to oversampling since this scheme is equivalent to reconstructing the signal at its lower regularly sampled resolution. This non-optimality is not a problem for most applications.

B2) Resampling Using Inverse Transformation Matrices

The inverse transformation matrices map a regular grid on the ground onto an irregular grid in the raw image. This is equivalent to considering $\{T0\}=\{1\}$ (raw image sampled at every pixels) regular and $\{T1\}$ irregular, with both expressed in pixels since they are defined in the raw image space. We define dx and dy, which must each verify $d=\max(T0,\{T1\})$.

If the local distances of the X matrix are denoted by $d_{i,j_x}$, then $$d_{i,j_x} = \max \begin{pmatrix} |X_{i,j} - X_{i-1,j-1}|, & |X_{i,j} - X_{i,j-1}|, \\ |X_{i,j} - X_{i-1,j}|, & |X_{i,j} - X_{i+1,j-1}|, \\ |X_{i,j} - X_{i+1,j+1}|, & |X_{i,j} - X_{i,j+1}|, \\ |X_{i,j} - X_{i-1,j+1}|, & |X_{i,j} - X_{i+1,j}| \end{pmatrix},$$

for all points (i,j) in the matrix X whose coordinates $X(i\pm 1, j\pm 1)$ are within the raw image. Then, to avoid aliasing, one should choose $dx=\max(1,\max(\{d_{i,j_x}\}))$. dy is determined using the same procedure applied to the Y matrix. Resampling is now straightforward because the points to be resampled are defined within the regular dataset of the raw image.

C) Robust Phase Correlation

According to a further embodiment of the present disclosure, a method to measure relative displacement between two images of the same resolution, one being a shifted version of the other, is shown.

Figure 6:
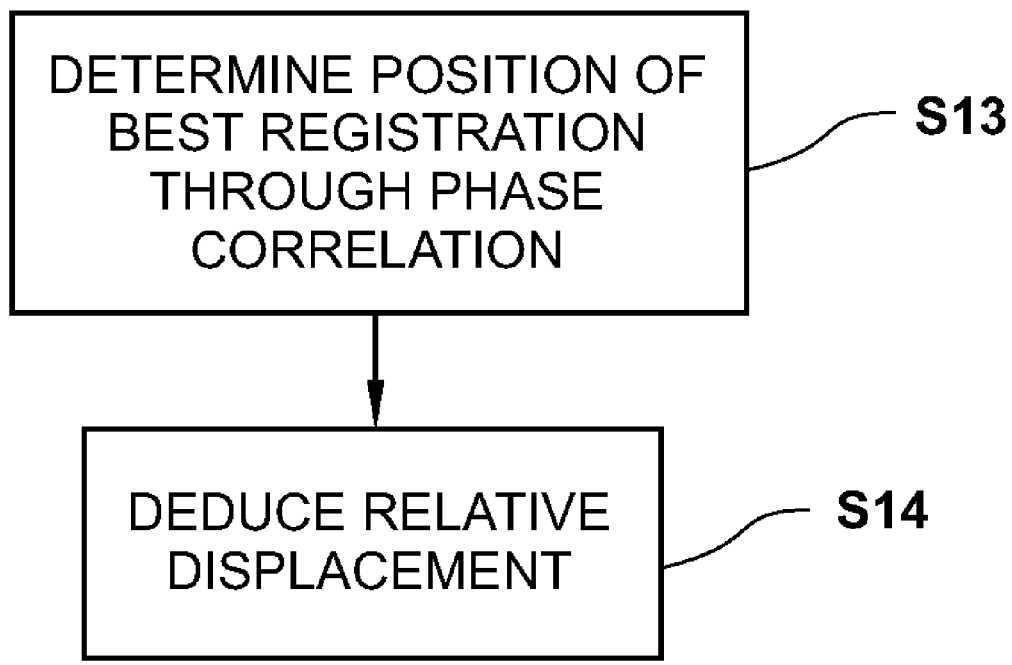
FIG. 6 shows a flowchart with reference to a method to measure relative displacement between two images of the same resolution, one being a shifted version of the other, in accordance with an embodiment of the present disclosure.

As generally discussed with reference to FIG. 6, a position of best registration between the two images is determined through phase correlation (S13), followed by determination of the relative displacement between the two images (S14) based on the position of best registration. Such displacement can be determined calculating when cross correlation between the two images attains a maximum. The cross correlation can be evaluated through a phase correlation method where relative displacement between the two images is recovered from a phase difference of a Fourier transform on the two images. Such phase difference can be calculated through minimization of a weighted residual matrix between a computed normalized cross spectrum of the two images and a theoretical normalized cross spectrum of the two images.

The above embodiment will now be explained in detail, with reference to an example thereof. In the example, the relative displacement between the two images can be recovered through explicit estimate of the linear phase of the cross spectrum of the two images. Further, frequency masking can be adopted during calculation of the phase difference. The phase difference and frequency masking can be calculated in an iterative manner.

In accordance with such example, applicants minimize, with respect to the Frobenius norm, the weighted residual matrix between the computed normalized cross-spectrum and the theoretical one. This approach allows applicants to explicitly solve the phase wrapping ambiguity, yielding accurate and robust displacement measurements at both subpixel and multipixel scales. This scheme also allows for flexibility on the frequency weighting. $Q(\omega_x,\omega_y)$ denotes the normalized cross-spectrum computed from the images and $C(\omega_x,\omega_y)$ the theoretical one. Define the function $$\phi(\Delta_x, \Delta_y) = \sum_{\omega_x=-\pi}^{\pi} \sum_{\omega_y=-\pi}^{\pi} W(\omega_x, \omega_y)|Q(\omega_x, \omega_y) - e^{j(\omega_x\Delta_x+\omega_y\Delta_y)}|^2,$$

where W is some weighting matrix with positive entries. We are looking for $(\Delta_x,\Delta_y)$ that minimize $\phi$. Let $$\phi\Delta(\omega_x,\omega_y)=W(\omega_x,\omega_y)|Q(\omega_x,\omega_y)-C(\omega_x,\omega_y)|^2.$$

We can write $$\varphi_\Delta(\omega_x, \omega_y) = W(\omega_x, \omega_y)[Q(\omega_x, \omega_y) - C(\omega_x, \omega_y)] \cdot$$
$$[Q(\omega_x, \omega_y) - C(\omega_x, \omega_y)]^*$$
$$= 2W(\omega_x, \omega_y) \begin{bmatrix} 1 - Q_R(\omega_x, \omega_y)\cos(\omega_x\Delta_x + \omega_y\Delta_y) - \\ Q_I(\omega_x, \omega_y)\sin(\omega_x\Delta_x + \omega_y\Delta_y) \end{bmatrix},$$

by setting $Q(\omega_x,\omega_y)=Q_R(\omega_x,\omega_y)+jQ_I(\omega_x,\omega_y)$ and by noticing that $Q_R^2(\omega_x,\omega_y)+Q_I^2(\omega_x,\omega_y)=1$ by definition of Q.

Considering ideal noiseless measurements and for a null expected translation between image patches, we approximate $\phi$ by $\tilde{\phi}$ such that $$\tilde{\phi}(\Delta_x, \Delta_y) \propto \left(ab - \frac{\sin(a\Delta_x)}{\Delta_x}\frac{\sin(b\Delta_y)}{\Delta_y}\right),$$

for $(\Delta x, \Delta y)$ in the physical solution set. Here, the frequency masking is modeled as an ideal rectangular low-pass filter with cut-off frequencies $\Omega x=a$, and $\Omega y=b$. Without masking, $a=b=\pi$. With appropriate initialization, a gradient descent algorithm to find $(\Delta_x, \Delta_y)$ that minimizes $\phi$ can be considered. The TPSS algorithm [21] is used. It is robust and converges rapidly, in typically less than ten iterations.

The proposed minimization algorithm is unconstrained and may provide a nonphysical solution. Assuming that no displacement exceed half the correlation window size, the physical displacement is given by $$\Delta_\varphi = \Delta - \left[\frac{\Delta}{N}\right]N,$$

where $\Delta$ is the optimum displacement returned by the algorithm, N is the 1-D correlation window size, and [·] is the rounding to the nearest integer operator.

C1) Adaptive Frequency Masking

A bias-free correlation can be achieved through frequency masking. Although any weighting matrix W with positive entries would be possible, applicants set, in accordance with an embodiment of the present application, the values $W(\omega_x, \omega_y)$ to be either zero (for corrupted frequencies) or one (for non-corrupted frequencies). High frequencies are the most likely to be corrupted due to optical aberrations and aliasing. The power spectrum of natural scenes is exponentially decreasing with frequency [35]-[37]. In the Fourier domain, the modulus of a white noise remains constant, and assuming that the images are degraded with some additive white noise, the phase information is then most likely to be biased in the high frequencies. We also want to filter out frequencies that correspond to the zeros of the resampling transfer function used for orthorectification. Thus, all frequencies where the phase information is the most likely to be corrupted share the same property: The magnitude of the cross-spectrum is much lower at these frequencies than at those where the phase is less likely to be corrupted. The mask is therefore defined by retaining only the frequencies where the magnitude of the cross-spectrum exceeds some threshold. A possible solution is to define $$\begin{cases} LS_{i_1 i_2}(\omega_x, \omega_y) = \log_{10}|I_1(\omega_x, \omega_y)I_2^*(\omega_x, \omega_y)|, \\ NLS_{i_1 i_2}(\omega_x, \omega_y) = LS_{i_1 i_2}(\omega_x, \omega_y) - \max\{LS_{i_1 i_2}(\omega_x, \omega_y)\}, \end{cases}$$

where $I_1$ and $I_2$ are the Fourier transform of the images to be correlated. LS stands for "log-spectrum" and NLS for "normalized log-spectrum." The frequency mask is then defined according to the parameter m such that $$W_{i_1 i_2}(\omega_x, \omega_y) = \begin{cases} 0, & \text{if } NLS_{i_1 i_2}(\omega_x, \omega_y) \leq m \cdot \mu\{NLS_{i_1 i_2}(\omega_x, \omega_y)\} \\ 1, & \text{otherwise.} \end{cases}$$

A value of m close to unity gives satisfactory results for most of the images. Then, only the frequencies that are the most likely to be corrupted are filtered out. These characteristics warrant unbiased correlation and ensure flexibility of the algorithm.

C2) Adding Robustness, Resampling in Frequency, and Fine Tuning of Frequency Mask The robustness and accuracy of the algorithm are improved by iterating it. Denote by $(\Delta_x^0, \Delta_y^0)$ the displacement measured after the first convergence of the algorithm and by $Q^0(\omega_x, \omega_y)$ the normalized cross-spectrum measured from the images to correlate. Once $(\Delta_x^0, \Delta_y^0)$ have been obtained, it is possible to compute $(\Delta_x^1, \Delta_y^1)$ from $Q^1(\omega_x, \omega_y)$ defined as $$Q^1(\omega_x, \omega_y) = Q^0(\omega_x, \omega_y)e^{-j(\omega_x\Delta_x^0 + \omega_y\Delta_y^0)}.$$

If the sequence $\{(\Delta_x^i, \Delta_y^i)\}$ converges toward zero, then the uncertainty on the measurement decreases. It is seen as a successive resampling of the images, done in the frequency domain by compensating the shift measured. The frequency mask is similarly adjusted. One may assign less weight to frequencies that have an original weight equal to unity but whose fit to the theoretical cross-spectrum is poor. Since Q and C are normalized, $|Q(\omega_x,\omega_y)-C(\omega_x,\omega_y)| \leq 2$. Hence, if $0 \leq W(\omega_x,\omega_y) \leq 1$, $\phi_\Delta(\omega_x,\omega_y) \in [0,4]$. Denote by $C^0(\omega_x,\omega_y)=e^{j(\omega_x\Delta_x^0+\omega_y\Delta_y^0)}$ the best match for the normalized cross-spectrum that has been first deduced from minimization. The residual per frequency after the first minimization is $$\phi_\Delta^0(\omega_x,\omega_y) = W^0(\omega_x,\omega_y)|Q^0(\omega_x,\omega_y)-C^0(\omega_x,\omega_y)|^2,$$

where $W^0$ is the original weighting matrix. A new weighting matrix is then defined as $$W^1(\omega_x, \omega_y) = W^0(\omega_x, \omega_y)\left(1 - \frac{\phi_\Delta^0(\omega_x, \omega_y)}{4}\right)^n.$$

According to one embodiment of the present disclosure, applicants have chosen n=6. This scheme forces the algorithm to converge toward a solution which is close to the first solution obtained, but it adds more robustness against noise in practice. Based on these principles, applicants define the robustness iterations as follows:

$$\begin{cases} Q^{i+1}(\omega_x, \omega_y) = Q^i(\omega_x, \omega_y)e^{-j(\omega_x\Delta_x^i + \omega_y\Delta_y^i)} \\ \phi_\Delta^i(\omega_x, \omega_y) = W^i(\omega_x, \omega_y)|Q^i(\omega_x, \omega_y) - C^i(\omega_x, \omega_y)|^2 \\ W^{i+1}(\omega_x, \omega_y) = W^i(\omega_x, \omega_y)\left(1 - \frac{\phi_\Delta^i(\omega_x, \omega_y)}{4}\right)^n. \end{cases}$$

The global shift between the two images is then given by:

$$\begin{cases} \Delta_x = \sum_i \Delta_x^i \\ \Delta_y = \sum_i \Delta_y^i. \end{cases}$$

The robustness iterations can stop when the sequence of $\{(\Delta_x^i, \Delta_y^i)\}$ becomes lower than some prescribed threshold. In practice, applicants prefer imposing a fixed number of iterations (up to four). It achieves good noise and bias reduction in the measurements while maintaining a reasonable computational cost.

From the quantities calculated above, the signal-to-noise ratio (SNR) of the measurement is given by $$SNR^i = 1 - \frac{\sum_{\omega_x} \sum_{\omega_y} \varphi_\Delta^i(\omega_x, \omega_y)}{4 \sum_{\omega_x} \sum_{\omega_y} W^i(\omega_x, \omega_y)}.$$

It quantifies the quality of the correlation and ranges from zero (no correlation) to one (perfect correlation).

C3) Initializing the Minimization Algorithm

The minimization algorithm should be initialized with some displacement $(\Delta_{x_0}, \Delta_{y_0})$. A gradient descent algorithm should be initialized with $(\Delta_{x_0}, \Delta_{y_0}) = (\Delta_x^* \pm 1, \Delta_y^* \pm 1)$ to converge toward the solution $(\Delta_x^*, \Delta_y^*)$. Applicants use the peak correlation method to approximate the solution. By providing that the displacement to be measured is less than half the correlation window size, this directly provides the physical solution. Designate by $(x_0, y_0)$ the integer coordinates of the correlation peak. Denote by $p_{x_i y_j}$ the amplitude of the correlation at coordinates $(x_i, y_i)$. Applicants obtain a better estimate by setting $$\begin{cases} \Delta_{x_0} = -\dfrac{\sum\limits_{i=-1}^{1} \sum\limits_{j=-1}^{1} x_i p_{x_i y_j}}{\sum\limits_{i=-1}^{1} \sum\limits_{j=-1}^{1} p_{x_i y_j}} \\ \Delta_{y_0} = -\dfrac{\sum\limits_{i=-1}^{1} \sum\limits_{j=-1}^{1} y_i p_{x_i y_j}}{\sum\limits_{i=-1}^{1} \sum\limits_{j=-1}^{1} p_{x_i y_j}}. \end{cases}$$

This approximation is computationally efficient and is used to initialize the minimization algorithm.

C4) Image Correlation, Complete Algorithm

Denote by $i_1$ a reference image (the master image) and by $i_2$ (the slave image) an image representing the same scene shifted by a translation. It is assumed that $i_1$ and $i_2$ share the same resolution. Let $p_1$ and $p_2$ be two overlapping patches extracted from $i_1$ and $i_2$. Let $p_1$ and $p_2$ be of size $2^M \times 2^M$ pixels with M such that $2^M$ is larger than twice the largest translation to be estimated. The SNR, thus the correlation accuracy, is higher when the overlapping area of patches to correlate is maximum. Patches to correlate are then iteratively relocated to compensate for their relative displacement. These iterations (usually at most two) are done from the peak correlation method to lower the computational cost. This method has been found as robust against noise as the minimizing algorithm for pixel scale measurements. The minimization algorithm is performed last on relocated patches.

In one dimension, the raised-cosine window of length N, N even, is given by:

$$w_{rc}(x) = \begin{cases} \cos^2\left(\dfrac{\pi}{2\beta N}\left(|x| - N\left(\dfrac{1}{2} - \beta\right)\right)\right), & \text{for } N\left(\dfrac{1}{2} - \beta\right) \le |x| \le \dfrac{N}{2}, \\ 1, & \text{for } |x| < N\left(\dfrac{1}{2} - \beta\right), \\ 0, & \text{otherwise,} \end{cases}$$

where $\beta$, called the roll-off factor, ranges from 0 to ½. The two-dimensional window is constructed assuming a separable window.

Step 1) Define two raised-cosine windows of size $2^M \times 2^M$, $w_{rc_1}$ with $\beta_1 = 0.35$ and $w_{rc_2}$ with $\beta_2 = 0.5$.

Step 2) Let $p_2^0 = p_2$. Correlate $p_1(x,y) w_{rc_1}(x,y)$ with $p_2^0(x,y) w_{rc_1}(x,y)$ using the peak correlation method [and applying the subpixel approximation as defined above]. The estimated translation is given by $(\tilde{\Delta}_x^0, \tilde{\Delta}_y^0)$. Let $(t_x^0, t_y^0) = ([\tilde{\Delta}_x^0], [\tilde{\Delta}_y^0])$, where $[\cdot]$ is the rounding to the nearest integer operator. Define $p_2^1(x,y) = p_2^0(x + t_x^0, y + t_y^0)$. Iterate Step 2) until $t_x^i \le 1$ and $t_y^i \le 1$. If convergence is not reached, then stop and set SNR=0. Else, let n+1 be the number of iterations needed to achieve convergence. Then, define $(\Delta_{x_0}, \Delta_{y_0}) = (\Delta_x^n, \tilde{\Delta}_y^n)$ and set $$\begin{cases} T_x = \sum_{i=0}^{n} t_x^i \\ T_y = \sum_{i=0}^{n} t_y^i. \end{cases}$$

Step 3) By taking $(\Delta_{x_0}, \Delta_{y_0})$ as initialization values, correlate using the phase minimization algorithm the patches $p_1(x,y) w_{rc_2}(x,y)$ and $p_2^n(x,y) w_{rc_2}(x,y)$. Set m close to unity. If the minimization does converge, let $(\Delta_{x_\phi}, \Delta_{y_\phi})$ be the physical solution derived. Otherwise, stop and set SNR=0. If $|\Delta_{x_\phi}| > 1.5$ or $|\Delta_{y_\phi}| > 1.5$ then stop and set SNR=0.

Step 4) (optional): Set $T_x = T_x + \Delta_{x_\phi}$ and $T_y = T_y + \Delta_{y_\phi}$. Using sinc interpolation, interpolate $p_2$ such that $p_2^n(x,y) = p_2^0(x + T_x, y + T_y)$. Set $(\Delta_{x_0}, \Delta_{y_0}) = (0,0)$. Then, go back to Step 3) only once.

Step 5) Return $(\Delta_x, \Delta_y, SNR) = (T_x + \Delta_{x_\phi}, T_y + \Delta_{y_\phi}, SNR)$.

In Step 2), the convergence within 0.5 pixel between two image patches cannot always be achieved. The correlation peak method exhibits some bias, and in noisy images, if a displacement of 0.5 pixel is to be measured, it can be systematically overestimated. Therefore, if a stopping condition such that $t_x^i = 0$ and $t_y^i = 0$ were set, displacements that could effectively be recovered in Step 3) would be lost. This situation has been encountered in practice. The consequence is that, in Step 3), offsets theoretically up to 1.5 pixels have to be measured. Step 4), which consists in precisely relocating the patch $p_2$ to maximize the overlap with the patch $p_1$, is optional. Precise relocation can be achieved from sinc interpolation. A larger patch has to be considered to avoid edge effects in the interpolated patch. Only one iteration of this optional step is applied since improvements on subsequent iterations are insignificant.

D) Corrected Orthorectification

According to a further embodiment of the present disclosure, a method to refine look directions of an aircraft or satellite for aerial or satellite imaging, is shown.

Figure 7:
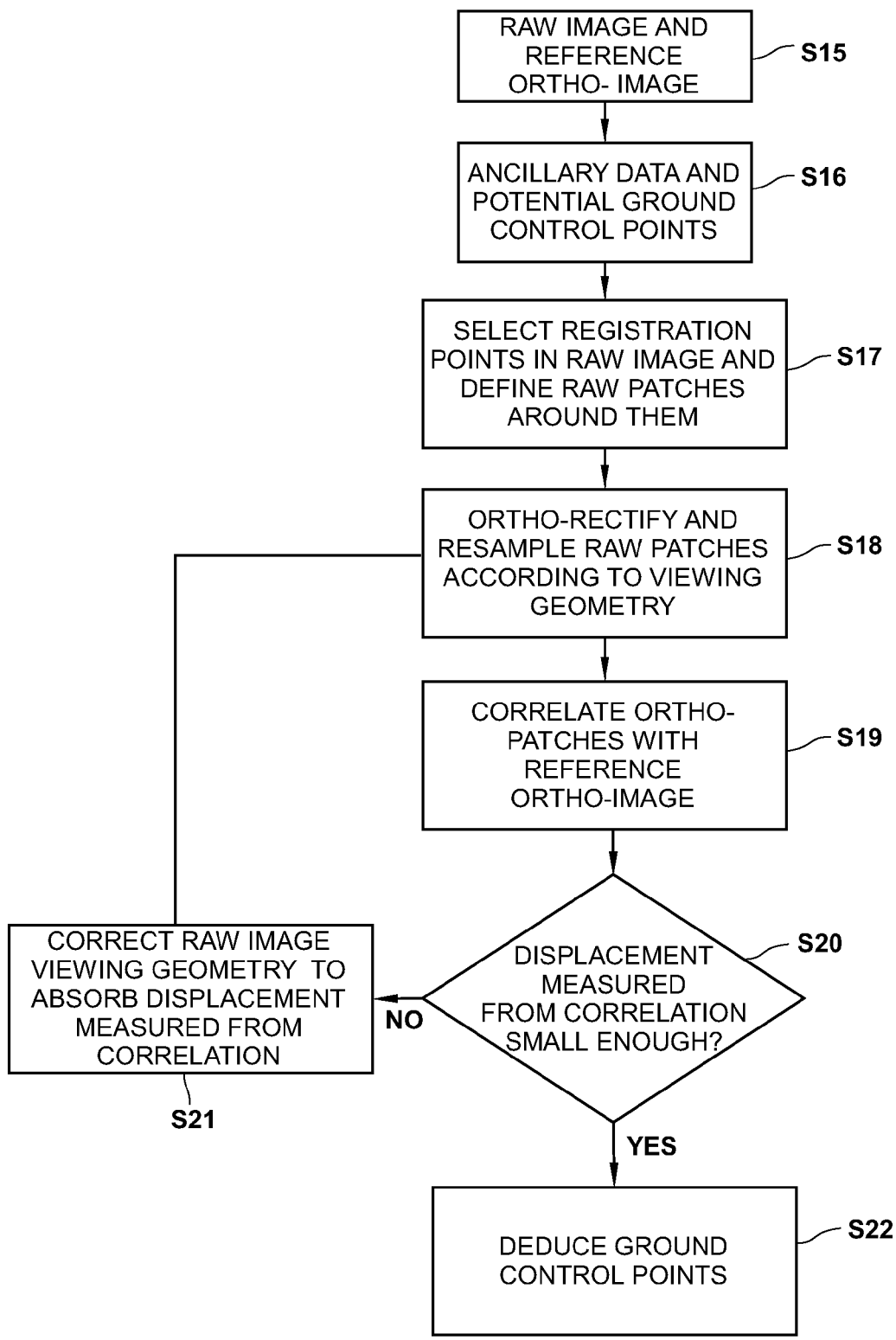
FIG. 7 shows a flowchart with reference to a method to refine look directions of an aircraft or satellite for aerial or satellite imaging, in accordance with an embodiment of the present disclosure.

As generally discussed with reference to FIG. 7, a raw image and a reference ortho-image are provided (S15), together with aircraft or satellite ancillary data and a potential initial set of ground control points (S16). Registration points are selected in the raw image and raw patches are defined around them (S17). The raw patches are ortho-rectified and resampled according to the viewing geometry (S18). The ortho-patches are then correlated with the reference ortho-image (S19). If the displacement measured from the correlation is small enough (S20), the ground control points are deduced (S22). Otherwise, the raw image viewing geometry is corrected to absorb the displacement measured from the correlation (S21) and the flow returns to step (S18).

The above embodiment will now be explained in detail, with reference to an example thereof.

D1) Problem Modeling

Given an ideal topographic model, orthorectified image misregistrations result from cumulative errors on the satellite viewing parameters, i.e., errors on the satellite look angles $\vec{u}_1$ that are modeling the optical system; the attitude variations of the platform given by the roll, pitch, and yaw angles; the spacecraft position; and velocity. For instance, on the SPOT systems, information on the satellite trajectory (position and velocity) is sampled every 30 s, while the image acquisition time is around 9 s. However, these data are recorded with a very high accuracy owing to the onboard Doppler Orbitography and Radio positioning Integrated by Satellite receiver system [40]. Root-mean square (RMS) error on the satellite position is less than 70 cm in each of the three satellite reference axes [15], and compared with the 830-km satellite altitude, it appears negligible. This high position accuracy combined with a very smooth trajectory of the satellite allows for a precise estimation of the satellite trajectory during the time of the image acquisition. Major uncertainties on the viewing parameters are therefore not likely to come from erroneous positions and velocities. All the remaining parameters that are composing the viewing geometry, i.e., optical model and attitude variations, are combined in the global look directions $\vec{u}_3$. The various sources of errors on each individual parameter might then be considered to contribute only to a global error on the resulting look directions. From this perspective, the strict constraint on the trajectory accuracy is loosened since an error in position can be modeled from different imaging parameters [41]. For example, changes on the altitude can be compensated from changes on the instrument focal length, which is a constituting parameter of the instrument modeling vectors $\vec{u}_3$.

D2) Look Directions Correction

Assume that the exact ground coordinates where a particular pixel has to be projected are known; say, the pixel $p(x_0,y_0)$ in the raw image is associated with the ground point $M_0$. The set $\{p(x_0,y_0),M_0\}$ is called a ground control point (GCP). Theoretically, the associated look direction $\vec{u}_{3_{th}}(x_0,y_0)$ is determined by $$\overrightarrow{O_3M_0} = \overrightarrow{O_3P}(y_0) + t \cdot \vec{u}_{3_{th}}(x_0,y_0), \text{ for some } t > 0.$$

Hence, this gives $$\vec{u}_{3_{th}}(x_0, y_0) = \frac{\overrightarrow{O_3M_0} - \overrightarrow{O_3P(y_0)}}{\left\|\overrightarrow{O_3M_0} - \overrightarrow{O_3P(y_0)}\right\|_2},$$

where $\overrightarrow{O_3P}(y_0)$ is the given satellite position at the time when the line $y_0$ was being acquired. Define $\vec{u}_3(x_0,y_0)$ as the look direction at the pixel $p(x_0,y_0)$, derived from the satellite ancillary data. The discrepancy with the theoretical look direction is $$\vec{du}_3(x_0, y_0) = \vec{u}_{3_{th}}(x_0, y_0) - \vec{u}_3(x_0, y_0),$$

$$= \frac{\overrightarrow{O_3M_0} - \overrightarrow{O_3P(y_0)}}{\left\|\overrightarrow{O_3M_0} - \overrightarrow{O_3P(y_0)}\right\|_2} - \vec{u}_3(x_0, y_0).$$

If three GCPs are given, the three discrepancies $\vec{du}_3(x_n,y_n)$ computed for n=0, 1, 2 can be linearly extrapolated in each of the three dimensions to correct all the look directions $\vec{u}_3(x,y)$ in the image. This correction compensates for any linear drift along the satellite trajectory, including linear drifts of the roll, pitch, and yaw angles. It yields a nonlinear correction in terms of ground coordinates, in particular, due to the topography.

If more than three GCPs are available, higher order corrections can be applied. Here, we determine the best linear correction in the least square sense. Given N pixels $p(x_n,y_n)$ associated to N ground coordinates $M_n$, N discrepancies $\vec{du}_3(x_n,y_n)$ for n=0, ..., N−1 are computed $$\vec{du}_3(x_n, y_n) = \vec{du}_3(n) = \begin{pmatrix} du_3^0(n) \\ du_3^1(n) \\ du_3^2(n) \end{pmatrix}, \text{ for } n = 1, \ldots, N.$$

Applicants assign a confidence level to each GCP through some weights $w_n$. Three corrective planes, each best approximating in the weighted least square sense the set of discrepancies $\vec{du}_3(n)$ in all three dimensions, must be computed. We are then to find the coefficients $(a^i, b^i, c^i)$ for i=0, 1, 2 such that $$\epsilon^i = \sum_{(x_n,y_n)} [w_n(a^i x_n + b^i y_n + c^i - du_3^i(n))]^2, \text{ for } i = 0, 1, 2,$$

is minimum. The solution is obtained by equating the partial derivatives of $\epsilon^i$ to zero. Define the constants $$\alpha_1 = \sum_{n=1}^N w_n^2 x_n^2 \quad \beta_2 = \sum_{n=1}^N w_n^2 y_n^2$$

$$\alpha_2 = \sum_{n=1}^N w_n^2 x_n y_n \quad \beta_3 = \sum_{n=1}^N w_n^2 y_n$$

-continued $$\alpha_3 = \sum_{n=1}^{N} w_n^2 x_n \quad \gamma_3 = \sum_{n=1}^{N} w_n^2.$$

Then, for each dimension i of $\vec{u}_3$, compute $$\delta_1^i = \sum_{n=1}^{N} w_n^2 x_n du_n^i,$$

$$\delta_2^i = \sum_{n=1}^{N} w_n^2 y_n du_n^i,$$

$$\delta_3^i = \sum_{n=1}^{N} w_n^2 du_n^i.$$

Hence, the sets of coefficients are determined by $$\begin{bmatrix} a^i \\ b^i \\ c^i \end{bmatrix} = \begin{bmatrix} \alpha_1 & \alpha_2 & \alpha_3 \\ \alpha_2 & \beta_2 & \beta_3 \\ \alpha_3 & \beta_3 & \gamma_3 \end{bmatrix} \cdot \begin{bmatrix} \delta_1^i \\ \delta_2^i \\ \delta_3^i \end{bmatrix}, \text{ for } i = 0, 1, 2.$$

A global correction matrix C is thus defined as $$C = \begin{bmatrix} a^0 & b^0 & c^0 \\ a^1 & b^1 & c^1 \\ a^2 & b^2 & c^2 \end{bmatrix}.$$

At any pixel (x,y) in the raw image, the approximated look direction discrepancy is therefore given by $$\vec{du}_{3_{app}}(x, y) = C \begin{bmatrix} x \\ y \\ 1 \end{bmatrix}.$$

Assuming N GCPs to be known prior to orthorectification, calculating C is a preprocessing step. During the orthorectification, once the look direction $\vec{u}_3(x,y)$ has been determined from the ancillary data, it is corrected by the corresponding approximated look direction discrepancy such that the new corrected look direction becomes $$\vec{u}_{3_{cor}}(x,y) = \vec{u}_3(x,y) + \vec{du}_{3_{app}}(x,y).$$

The orthorectification process is then pursued following the standard procedure. In case of a non-corrected orthorectification or if no GCPs are provided, entries of C are set to zero. Then, $\vec{u}_{3_{cor}}(x,y) = \vec{u}_3(x,y)$.

E) Look Directions Optimization from Precise GCPs Generation

Instead of optimizing the viewing parameters from a given set of GCPs, applicants disclose a global scheme that iteratively refines a rough selection of GCPs such that the look directions correction implied allows for precise image georeferencing and co-registration. This general principle is described next, followed by its particular application to image georeferencing and then to image co-registration.

E1) Acquiring Precise GCP Principle

Given a raw image, selected patches are roughly ortho-rectified using only the satellite ancillary data. GCPs are then determined from the misregistration, measured from correlation, between these image patches and a ground reference image. The reference image can be a previously orthorectified image, or a shaded version of the digital elevation model. A global methodology is as follows:

i) selecting a plurality of image control points in the raw image;
ii) calculating an initial correction operator from the aircraft or satellite ancillary data and the potential initial set of ground control points;
iii) based on the aircraft or satellite ancillary data and the potential initial correction operator, projecting on the ground the image control points, thus associating the image control points with ground coordinates and forming approximated ground control points;
iv) selecting reference image patches in the ground reference image based on the ground coordinates, the reference image patches defining ground grids;
v) performing ortho-rectification on the ground grids based on the initial correction operator to produce approximate ortho-rectified image patches;
vi) correlating the reference image patches with the approximate ortho-rectified image patches to obtain image shifts between the reference image patches and the approximate ortho-rectified image patches;
vii) defining an updated set of ground control points based on the image shifts;
viii) defining an updated correction operator based on the updated set of ground control points;
ix) repeating steps ii)-viii) based on the updated set of ground control points until a convergence condition is obtained.

The image control points can be at least three image control points. The correction operator can be a polynomial correction in each dimension X, Y, Z of the aircraft or satellite look directions, expressed in the Terrestrial coordinate system. More particularly:

1) Select a set of at least three pixels in the raw image. Call this set of pixels $\{p(x_i,y_i)\}$, with $x_i,y_i$ integers, the image control points (ICP). They have been designated to become the future GCPs.

2) From the satellite ancillary data and a given set of GCPs, $\{GCP^0\}$, deduce the correction matrix $C^0$.

3) From the satellite ancillary data and the matrix $C^0$, project on the ground the ICPs. The direct corrected model orthorectification is applied here. All ICPs $p(x_i,y_i)$ are associated with ground coordinates $(\lambda_i^0, \phi_i^0, h_i^0)$ then forming approximated GCPs.

4) Locate in the reference image the closest integer pixels to the points of coordinates $(\lambda_i^0, \phi_i^0)$. Call these pixels $p_{ref_i}^0$. In the reference image, select N×N pixels patches, $P_{ref_i}^0$, centered on the pixels $p_{ref_i}^0$.

5) According to the ground grids defined by the patches $P_{ref_i}^0$ (ground resolution and coordinates), ortho-rectify onto the same grids, using the inverse model orthorectification method and the correction implied by $C^0$, the raw image. It produces the roughly ortho-rectified patches $\tilde{P}_i^0$.

6) Correlate the reference patches $P_{ref_i}^0$ with the patches $\tilde{P}_i^0$. Deduce the north/south and the east/west geographical shifts $(\Delta\lambda_i^0, \Delta\phi_i^0)$ between the patches. SNRs of the correlations are designated by $SNR_i^0$.

7) From the DEM, determine from bicubic interpolation the elevations $h_i^0$ of the ground points $(\lambda_i^0 + \Delta\lambda_i^0, \phi_i^0 - \Delta\phi_i^0)$. Define the new set of GCPs such that $\{GCP_i^1\} = \{(\lambda_i^0 + \Delta\lambda_i^0, \phi_i^0 - \Delta\phi_i^0, h_i^0, SNR_i^0)\}$.

8) Go back to 2) and iterate the global process by providing the set of refined GCPs $\{GCP_i^1\}$ as a priori knowledge for the next round. The SNR on the GCPs is used as a confidence weight to determine the new correction matrix $C^1$.

This process is repeated until both the mean and the standard deviation of the ground misregistrations $(\Delta\lambda_i,\Delta\phi_i)$, weighted by the SNR and taken over all GCPs, become stable. When this procedure is stopped, we are left with an accurate set of GCPs: $\{GCP_i^{k+1}\}=\{(x_i,y_i,\lambda_i^k+\Delta\lambda_i^k,\phi_i^k-\Delta\phi_i^k,h_i^k,SNR_i^k)\}$ if k+1 is the total number of iterations. This set of GCPs is then utilized to ortho-rectify the raw image from the inverse corrected orthorectification scheme.

The algorithm is initialized by the GCP set $\{GCP^0\}$, from which $C^0$ is calculated. This initial correction ensures a significant overlap of the patches to correlate, even though the satellite parameters maybe largely biased. This initial correction is not always needed when the satellite ancillary data are accurate enough. Then, the set $\{GCP^0\}$ is empty and $C^0=0$. If the satellite ancillary data are largely biased, the set $\{GCP^0\}$ can consist of three GCPs, which are manually selected.

F) Complete Processing Chain

According to a further embodiment of the present disclosure, a method to ortho-rectify and co-register a set of raw satellite or raw aerial images of a surface is shown.

Figure 8:
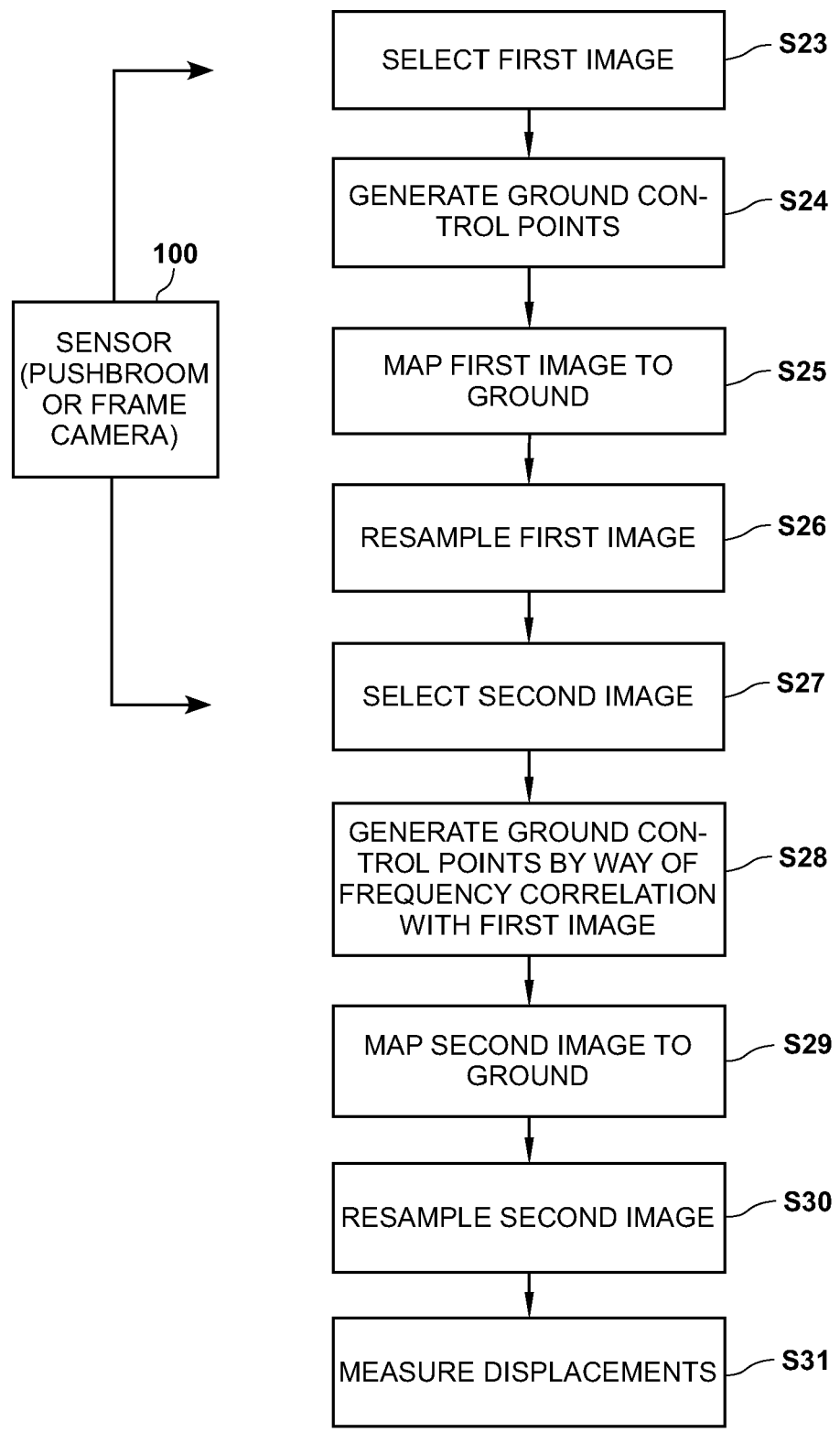
FIG. 8 shows a flowchart with reference to a method to ortho-rectify and co-register a set of raw satellite or raw aerial images of a surface, in accordance with an embodiment of the present disclosure.

As generally discussed with reference to FIG. 8, a first raw satellite or raw aerial image is selected (S23) and ground control points for the first raw image are generated (S24), with respect to a given ortho-rectified reference image. The first image is mapped to ground (S25) based on the ground control points and then resampled (S26) to produce a first ortho-rectified image. A second raw satellite or raw aerial image is selected (S27) from a set of satellite or aerial images, usually acquired through a pushbroom or frame camera sensor (100). Ground control points on the second image are generated by way of frequency correlation with the first image (S28). The second image is then mapped to ground (S29) and resampled (S30). If desired, potential surface displacements can be measured (S31) by way of frequency correlation between the first ortho-rectified image and the second ortho-rectified image.

The above embodiment will be now explained in detail, with reference to an example thereof.

In particular, summarized herewith is an example of the complete procedure to accurately ortho-rectify and coregister a set of pushbroom satellite images and to retrieve ground displacements from pre- and post-event images. It is assumed that ancillary data on the satellite viewing geometry are available with the raw images. It is also assumed that a topographic model whose resolution is close to the ground resolution of the images is provided.

1) One image of the set is chosen to be the reference image. A shaded version of the topographic model can be used as first reference if no ortho-image is already available. If the satellite viewing parameters for this particular image are largely biased, three GCPs are visually selected from the shaded topographic model. On visually recognizable topographic features, ICPs are selected from the raw image, and GCPs are generated using correlation on the shaded topography.

2) From the set of GCPs obtained, the mapping of the raw image onto the ground is computed with the inverse orthorectification model. Two inverse transformation matrices, one for each of the two dimensions of the image, are created.

3) The reference image is resampled according to the transformation matrices.

4) Another raw image of the set is chosen. Three GCPs are manually selected from the first ortho-rectified image, if needed. ICPs are chosen from the raw image, and GCPs are generated using frequency correlation on the reference image.

5) The raw image is ortho-rectified according to the set of GCPs devised. It is then resampled. An accurately orthorectified and coregistered image is produced.

Steps 4) and 5) are repeated if more than two images of the same area have to be coregistered.

6) The image ground projection grids have been designed so that they all align exactly. Any change detection algorithm can then be applied on overlapping areas. In the case of ground deformation measurements, correlation using frequency correlation is performed between sliding windows scanning the pre- and post-event images. Each correlation results in a measure of displacement along the lines (east/west displacements) and along the columns (north/south displacements) of the ortho-images.

The correlation grid is defined from three parameters: the correlation window size, the step size (defining the correlation image pixel size), and the coordinates in the master image where the correlation starts. The starting pixel is the closest to the upper-left master image corner whose ground coordinates are multiple of both the image resolution and the correlation step size. Doing so allows to mosaic or stack correlation images without further resampling.

In summary, according to some of the embodiments of the present disclosure, methods and/or procedures are described to accurately measure ground deformations from optical satellite images. Precise orthorectification is obtained owing to an optimized model of the imaging system, where look directions are linearly corrected to compensate for attitude drifts, and sensor orientation uncertainties are accounted for. Applicants introduce a new computation of the inverse projection matrices for which a rigorous resampling is proposed. The irregular resampling problem is explicitly addressed to avoid introducing aliasing in the ortho-rectified images. Image registration and correlation is achieved with a new iterative unbiased processor that estimates the phase plane in the Fourier domain for subpixel shift detection. Without using supplementary data, raw images are warped onto the digital elevation model and co-registered with a 1/50 pixel accuracy. The procedure applies to images from any pushbroom imaging system. The proposed technique also allows precise co-registration of images for the measurement of surface displacements due to ice-flow or geomorphic processes, or for any other change detection applications.

The entire disclosure of each document cited (including patents, patent applications, journal articles, abstracts, laboratory manuals, books, or other disclosures) in the present disclosure, including the list of references, is hereby incorporated herein by reference.

It is to be understood that the disclosures are not limited to particular methods, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

[1] J. Townshend, C. Justice, C. Gurney, and J. McManus, "The impact of misregistration on change detection," *IEEE Trans. Geosci. Remote Sens.*, vol. 30, no. 5, pp. 1054-1060, September 1992.

[2] N. Bryant, A. Zobrist, and T. Logan, "Automatic co-registration of spacebased sensors for precision change detection and analysis," in *Proc. IGARSS*, July 2003, vol. 2, pp. 1371-1373.

[3] X. Dai and S. Khorram, "Effects of image misregistration on the accuracy of remotely sensed change detection," *IEEE Trans. Geosci. Remote Sens.*, vol. 36, no. 5, pp. 1566-1577, September 1998.

[4] N. Van Puymbroeck, R. Michel, R. Binet, J.-P. Avouac, and J. Taboury, "Measuring earthquakes from optical satellite images," *Appl. Opt.*, vol. 39, no. 20, pp. 3486-3494, July 2000.

[5] H. Vadon and D. Massonnet, "Earthquake displacement fields mapped by very precise correlation. Complementarity with radar interferometry," in *Proc. IGARSS*, Honolulu, Hi., July 2000, vol. 6, pp. 2700-2702.

[6] S. Dominguez, J.-P. Avouac, and R. Michel, "Horizontal coseismic deformation of the 1999 Chi-Chi earthquake measured from SPOT satellite images; implications for the seismic cycle along the western foothills of central Taiwan," *J. Geophys. Res.*, vol. 108, no. B2, p. 2083, 2003.

[7] R. Binet and L. Bollinger, "Horizontal coseismic deformation of the 2003 Bam (Iran) earthquake measured from SPOT-5 THR satellite imagery," *Geophys. Res. Lett.*, vol. 32, no. 2, pp. L02307.1-L02307.4, 2005.

[8] E. Berthier, H. Vadon, D. Baratoux, Y. Arnaud, C. Vincent, K. Feigl, F. Remy, and B. Legresy, "Surface motion of mountain glaciers derived from satellite optical imagery," *Remote Sens. Environ.*, vol. 95, no. 1, pp. 14-28, 2005.

[9] R. Crippen and R. Blom, "Measurement of subresolution terrain displacements using SPOT panchromatic imagery," in *Proc. IGARSS*, June 1991, vol. 3, pp. 1667-1670.

[10] R. Michel and J.-P. Avouac, "Deformation due to the 17 Aug. 1999 Izmit, Turkey, earthquake measured from SPOT images," *J. Geophys. Res.*, vol. 107, no. B4, p. 2062, 2002.

[11] C. Schiek, "Terrain change detection using ASTER optical satellite imagery along the Kunlun fault, Tibet," M.S. thesis, Univ. Texas, El Paso, Tex., 2004. [Online]. Available: http://www.geo.utep.edu/pub/schiek/Cara_Schiek_Master_Thesis.pdf

[12] D. Massonnet, M. Rossi, C. Carmona, F. Adragna, G. Peltzer, K. Feigl, and T. Rabaute, "The displacement field of the Landers earthquake mapped by radar interferometry," *Nature*, vol. 364, no. 6433, pp. 138-142, July 1993.

[13] *SPOT User's Handbook*, SPOT Image Corporation, Reston, Va., 1990.

[14] J. P. Avouac, F. Ayoub, S. Leprince, O. Konca, and D. Helmberger, "The 2005, Mw 7.6 Kashmir earthquake, rupture kinematics from sub-pixel correlation of ASTER images and seismic waveforms analysis," *Earth Planet. Sci. Lett.*, vol. 249, no. 3/4, pp. 514-528, 2006.

[15] S. Riazanoff, *SPOT Satellite Geometry Handbook*. Toulouse, France: SPOT Image, January 2002.

[16] Z. Altamini, P. Sillard, and C. Boucher, "ITRF 2000: A new release of the international terrestrial reference frame for Earth sciences applications," *J. Geophys. Res.*, vol. 107, no. B10, p. 2214, 2002.

[17] J. Snyder, *Map Projections—A Working Manual*, ser. U.S. Geological Survey Professional Paper 1395. Washington, D.C.: Government Printing Office, 1987.

[18] T. Westin, "Precision rectification of SPOT imagery," *Photogramm. Eng. Remote Sens.*, vol. 56, no. 2, pp. 247-253, 1990.

[19] L. Chen and L. Lee, "Rigorous generation of digital orthophotos from SPOT images," *Photogramm. Eng. Remote Sens.*, vol. 59, no. 5, pp. 655-661, 1993.

[20] Y. El-Manadili and K. Novak, "Precision rectification of SPOT imagery using the direct linear transformation model," *Photogramm. Eng. Remote Sens.*, vol. 62, no. 1, pp. 67-72, 1996.

[21] J. Barzilai and J. Borwein, "Two-point step size gradient methods," *IMA J. Numer. Anal.*, vol. 8, no. 1, pp. 141-148, 1988.

[22] R. Keys, "Cubic convolution interpolation for digital image processing," *IEEE Trans. Acoust., Speech, Signal Process.*, vol. ASSP-29, no. 6, pp. 1153-1160, December 1981.

[23] A. Oppenheim, R. Schafer, and J. Buck, *Discrete-Time Signal Processing*, 2nd ed. Upper Saddle River, N.J.: Prentice-Hall, 1999.

[24] P. P. Vaidayanathan, *Multirate Systems and Filter Banks*. Upper Saddle River, N.J.: Prentice-Hall, 1993.

[25] B. Zitová and J. Flusser, "Image registration methods: A survey," *Image Vis. Comput.*, vol. 21, no. 11, pp. 977-1000, 2003.

[26] H. Foroosh, J. Zerubia, and M. Berthod, "Extension of phase correlation to subpixel registration," *IEEE Trans. Image Process.*, vol. 11, no. 3, pp. 188-200, March 2002.

[27] W. Hoge, "A subspace identification extension to the phase correlation method [mri application]," *IEEE Trans. Med. Imag.*, vol. 22, no. 2, pp. 277-280, February 2003.

[28] H. Stone, M. Orchard, C. Ee-Chien, and S. Martucci, "A fast direct Fourier-based algorithm for subpixel registration of images," *IEEE Trans. Geosci. Remote Sens.*, vol. 39, no. 10, pp. 2235-2243, October 2001.

[29] H. Carfantan and B. Rouge, "Estimation non biaisée de décalages subpixelaire sur les images SPOT," in *Proc. Colloque GRETSI*, Toulouse, France, September 2001.

[30] J. Goodman, *Introduction to Fourier Optics*, 2nd ed. New York: McGraw-Hill, 1996.

[31] A. Leon-Garcia, *Probability and Random Processes for Electrical Engineering*, 2nd ed. Reading, Mass.: Addison-Wesley, 1994.

[32] C. Knapp and G. C. Carter, "The generalized correlation method for estimation of time delay," *IEEE Trans. Acoust., Speech, Signal Process.*, vol. ASSP-24, no. 4, pp. 320-327, August 1976.

[33] G. H. Golub and C. F. V. Loan, *Matrix Computations*, 2nd ed. Baltimore, Md.: The Johns Hopkins Univ. Press, 1989.

[34] J. Manton, R. Mahony, and Y. Hua, "The geometry of weighted low-rank approximations," *IEEE Trans. Signal Process.*, vol. 51, no. 2, pp. 500-514, February 2003.

[35] D. Field, "Relations between the statistics of natural images and the response properties of cortical-cells," *J. Opt. Soc. Amer. A, Opt. Image Sci.*, vol. 4, no. 12, pp. 2379-2394, 1987.

[36] D. Tolhurst, Y. Tadmor, and T. Chao, "Amplitude spectra of natural images," *Ophthalmic Physiol. Opt.*, vol. 12, no. 2, pp. 229-232, 1992.

[37] A. van der Schaaf and J. van Hateren, "Modeling the power spectra of natural images: Statistics and information," *Vis. Res.*, vol. 36, no. 17, pp. 2759-2770, 1996.

[38] C. Latry and B. Rouge, "Optimized sampling for CCD instruments: The Supermode scheme," in *Proc. IGARSS*, July 2000, vol. 5, pp. 2322-2324.

[39] *SPOT Satellite Technical Data*, 2003, Toulouse, France: SPOT Image. [Online]. Available: http://www.spotimage.fr

[40] C. Jayles and M. Costes, "Ten centimeters orbits in real-time on-board of a satellite, DORIS/DIODE current status," *Acta Astronaut.*, vol. 54, no. 5, pp. 315-323, 2004.

[41] T. Westin, "Interior orientation of SPOT imagery," in *Proc. 27th ISPRS Congr., Commission I*, Washington, D.C., 1992, vol. 29, pp. 193-198. 1558 IEEE TRANSACTIONS ON GEOSCIENCE AND REMOTE SENSING, VOL. 45, NO. 6, JUNE 2007

[42] M. Sveldow, C. McGillem, and P. Anuta, "Image registration: Similarity measure and preprocessing method comparisons," *IEEE Trans. Aerosp. Electron. Syst.*, vol. AES-14, no. 1, pp. 141-149, January 1978.

[43] W. Pratt, "Correlation techniques of image registration," *IEEE Trans. Aerosp. Electron. Syst.*, vol. AES-10, no. 3, pp. 353-358, May 1974.

[44] N. Dodgson, "Quadratic interpolation for image resampling," *IEEE Trans. Image Process.*, vol. 6, no. 9, pp. 1322-1326, September 1997.

[45] *Shuttle Radar Topography Mission*, 2000, JPL-NASA. [Online]. Available: http://www2.jpl.nasa.gov/srtm/statistics.html

[46] X. Li and H. Gotze, "Tutorial: Ellipsoid, geoid, gravity, geodesy, and geophysics," *Geophysics*, vol. 66, no. 6, pp. 1660-1668, 2001.

[47] *Caltech Online Catalog.* [Online]. Available: http://www.data.scec.org/catalog_search/date_mag_loc.php

[48] M. Simons, Y. Fialko, and L. Rivera, "Coseismic deformation from the 1999 Mw 7.1 Hector Mine, Calif., earthquake as inferred from InSAR and GPS observations," *Bull. Seismol. Soc. Amer.*, vol. 92, no. 4, pp. 1390-1402, 2002.

[49] J. A. Treiman, K. J. Kendrick, W. A. Bryant, T. K. Rockwell, and S. F. McGill, "Primary surface rupture associated with the Mw 7.1 16 Oct. 1999 Hector Mine earthquake, San Bernardino County, California," *Bull. Seismol. Soc. Amer.*, vol. 92, no. 4, pp. 1171-1191, 2002.

[50] G. Peltzer, F. Crampé, and P. Rosen, "The Mw 7.1, Hector Mine, California earthquake: Surface rupture, surface displacement field, and fault slip solution from ERS SAR data," *C. R. Acad. Sci. Paris, Earth Planet. Sci.*, vol. 333, no. 9, pp. 545-555, 2001.

[51] Y. Fialko, M. Simons, and D. Agnew, "The complete (3-D) surface displacement field in the epicentral area of the 1999 Mw 7.1 Hector Mine earthquake, California, form space geodetic observations," *Geophys. Res. Lett.*, vol. 28, no. 16, pp. 3063-3066, 2001.

[52] R. Michel, J. P. Avouac, and J. Taboury, "Measuring near field coseismic displacements from SAR images: Application to the Landers earthquake," *Geophys. Res. Lett.*, vol. 26, no. 19, pp. 3017-3020, 1999.

[53] *ASTER User's Guide, Part I-II*, Earth Remote Sensing Data Analysis Center, Tokyo, Japan, 2001.

The invention claimed is:

1. A method to ortho-rectify and co-register a set of raw satellite or raw aerial images of a surface, the method comprising:

selecting a first raw satellite or raw aerial image;

generating a first set of ground control points for the first raw image, with respect to a given ortho-rectified reference image;

based on the first set of generated ground control points, mapping the first raw image onto ground;

resampling the first mapped image to produce a first ortho-rectified image;

selecting a second raw satellite or raw aerial image, the second image being selected from the set of satellite or aerial images;

generating a second set of ground control points for the second raw image, with respect to the first ortho-rectified image, by way of frequency correlation on the first image;

based on the second set of generated ground control points, mapping the second raw image onto ground; and resampling the second mapped image, to produce a second ortho-rectified image, whereby the first ortho-rectified image and the second ortho-rectified image are co-registered images.

2. The method of claim 1, further comprising:

measuring potential surface displacements by way of frequency correlation between the first ortho-rectified image and the second ortho-rectified image.

3. The method of claim 1, wherein the images are acquired either by a pushbroom sensor or by a frame camera sensor, and where the sensor is either an instrument on-board an aircraft or on-board a spacecraft.

4. The method of claim 1, wherein generating each set of ground control points comprises starting from an initial set of ground control points and iteratively refining the initial set.

5. The method of claim 1, wherein the surface displacements are chosen from a set consisting of static displacements and flow displacements.

6. The method of claim 1, wherein the reference image is chosen from an already available ortho-rectified image.

7. The method of claim 1, wherein the reference image is chosen by building a synthetic reference image.

8. The method of claim 7, wherein the synthetic reference image is built by shading a provided topographic model.

9. The method of claim 1, wherein the mapping of the raw images onto ground is performed by way of an inverse orthorectification model.

10. The method of claim 9, wherein the inverse orthorectification model creates two inverse transformation matrices, one of each dimension of the raw image.

11. The method of claim 10, wherein the resampling of the mapped images is based on the two inverse transformation matrices.

12. A method for mapping an aerial or satellite image from an aerial or satellite image plane onto a ground reference system, the method comprising:

i) determining an image footprint of the aerial or satellite image;

ii) defining the ground reference system; and iii) for each point on the ground pertaining to the ground reference system, finding coordinates in the aerial or satellite image that are associated with said point on the ground by:

a) defining a projection plane by way of ground coordinates of said point on the ground;

b) defining a projection for all points in the aerial or satellite plane onto the projection plane to obtain projected image points;

c) defining distances between said point on the ground and the projected image points; and d) choosing, as image coordinates of said point on the ground, the image coordinates of the projected image point having minimum distance from the point on the ground.

13. The method of claim 12, wherein outputs of the minimization are stored into matrices with dimensions determined by sampling of the ground reference system.

14. The method of claim 12, wherein the starting coordinates of the ground reference system are a multiple of a desired resolution of the aerial or satellite ortho-rectified image.

15. The method of claim 12, wherein said minimizing is performed with a gradient algorithm.

16. The method of claim 15, wherein the gradient algorithm is a two-point step size gradient algorithm.

17. The method of claim 12, wherein the ground reference system is defined as the smallest rectangular grid that includes the image footprint.

18. A method for irregularly resampling uniformly spaced data of a sampled signal representing an aerial or satellite image, comprising
i) defining an image reconstruction filter of the form $$h_{r_{d_x,d_y}}(x, y) = \begin{cases} \dfrac{\sin\left(\dfrac{\pi x}{d_x}\right)}{\dfrac{\pi x}{d_x}} \cdot \dfrac{\sin\left(\dfrac{\pi y}{d_y}\right)}{\dfrac{\pi y}{d_y}}, & \text{for } x, y \neq 0, \\ 1, & \text{for } x, y = 0, \end{cases}$$

wherein
$h_r$ is the image reconstruction filter
x and y are directions of the aerial or satellite image, and
$d_x$ and $d_y$ are resampling distances representing maximum distance between adjacent samples in the x and y directions, and
ii) reconstructing the resampled image signal according to the image reconstruction filter.

19. The method of claim 18, wherein the resampling distances dx and dy are obtained from maximum absolute differences between adjacent entries in inverse transformation matrices.

20. The method of claim 18, wherein:
the resampling distances dx and dy are obtained as d=max (T0,{T1}) along the directions x and y respectively,
T0 represents the regular sampling period of the signal to be resampled, and
{T1} represents a set of jittered sampling periods of the resampled signal.

21. A method to measure relative displacement between two images of the same resolution, one being a shifted version of the other, the method comprising:
determining a position of best registration between the two images; and
determining relative displacement between the two images based on the position of best registration by calculating when cross correlation between the two images attains a maximum, the cross correlation being evaluated through a phase correlation method where relative displacement between the two images is recovered from a phase difference of a Fourier transform of the two images,
wherein the phase difference of the Fourier transform of the two images is calculated through minimization of a weighted residual matrix between a computed normalized cross spectrum of the two images and a theoretical normalized cross spectrum of the two images.

22. The method of claim 21, wherein the relative displacement between the two images is recovered through explicit estimate of the linear phase of the cross spectrum of the two images.

23. The method of claim 21, further comprising adopting frequency masking during calculation of the phase difference.

24. The method of claim 23, wherein the frequency masking is calculated in an iterative manner.

25. The method of claim 21, wherein the phase difference of the transform of the two images is calculated in an iterative manner.

26. A method to refine look directions of an aircraft or satellite for aerial or satellite imaging, comprising:
providing a raw image;
providing aircraft or satellite ancillary data and a potential initial set of ground control points;
selecting image patches in the raw image; and
determining ground control points of the raw image by measuring misregistration between the selected image patches and a ground reference image.

27. The method of claim 26, wherein the step of determining the ground control points of the raw image comprises:
i) selecting a plurality of image control points in the raw image;
ii) calculating an initial correction operator from the aircraft or satellite ancillary data and the potential initial set of ground control points;
iii) based on the aircraft or satellite ancillary data and the potential initial correction operator, projecting on the ground the image control points, thus associating the image control points with ground coordinates and forming approximated ground control points;
iv) selecting reference image patches in the ground reference image based on the ground coordinates, the reference image patches defining ground grids;
v) performing ortho-rectification on the ground grids based on the initial correction operator to produce approximate ortho-rectified image patches;
vi) correlating the reference image patches with the approximate ortho-rectified image patches to obtain image shifts between the reference image patches and the approximate ortho-rectified image patches;
vii) defining an updated set of ground control points based on the image shifts;
viii) defining an updated correction operator based on the updated set of ground control points;
ix) repeating steps ii)-viii) based on the updated set of ground control points until a convergence condition is obtained.

28. The method of claim 27, wherein the plurality of image control points are at least three image control points.

29. The method of claim 27, wherein the correction operator is a polynomial correction in each dimension X,Y,Z, of the aircraft or satellite look directions, expressed in the Terrestrial coordinate system.

* * * * *